United States Patent
Hosokawa et al.

(10) Patent No.: US 10,600,322 B2
(45) Date of Patent: Mar. 24, 2020

(54) MANAGEMENT OF MOBILE OBJECTS

(71) Applicant: INTERNATIONAL BUSINESS MACHINES CORPORATION, Armonk, NY (US)

(72) Inventors: Satoshi Hosokawa, Funabashi (JP); Yasutaka Nishimura, Yamato (JP); Makoto Tanibayashi, Sugamachi (JP); Shoichiro Watanabe, Nerima-ku (JP)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 15/628,815

(22) Filed: Jun. 21, 2017

(65) Prior Publication Data

US 2018/0374355 A1     Dec. 27, 2018

(51) Int. Cl.

| | |
|---|---|
| *G08G 1/16* | (2006.01) |
| *B60W 30/08* | (2012.01) |
| *B60W 30/095* | (2012.01) |
| *G06F 17/30* | (2006.01) |
| *G05D 1/02* | (2006.01) |
| *G06F 16/48* | (2019.01) |

(Continued)

(52) U.S. Cl.
CPC ............. *G08G 1/162* (2013.01); *B60W 30/08* (2013.01); *B60W 30/0953* (2013.01); *B60W 30/0956* (2013.01); *G05D 1/0238* (2013.01); *G06F 16/29* (2019.01); *G06F 16/489* (2019.01); *G08G 1/0112* (2013.01); *G08G 1/09623* (2013.01); *G01S 17/936* (2013.01)

(58) Field of Classification Search
CPC ....... G08G 1/162; G06F 16/489; G06F 16/29; B60W 30/08; B60W 30/0953; B60W 30/0956; G05D 1/0238; G01S 17/936

USPC ........................................................ 701/301
See application file for complete search history.

(56) References Cited

U.S. PATENT DOCUMENTS

| | | | |
|---|---|---|---|
| 4,350,970 A | 9/1982 | Von Tomkewitsch | |
| 4,907,159 A | 3/1990 | Mauge | |

(Continued)

FOREIGN PATENT DOCUMENTS

| | | | |
|---|---|---|---|
| CN | 102147260 A | 8/2011 | |
| CN | 102231231 A | 11/2011 | |

(Continued)

OTHER PUBLICATIONS

International Searching Authority, "Notification of Transmittal of the International Search Report and the Written Opinion of the International Searching Authority, or the Declaration," Patent Cooperation Treaty, Oct. 17, 2018, 31 Pages, International Application No. PCT/IB2018/0054408.

(Continued)

*Primary Examiner* — Tuan C To
(74) *Attorney, Agent, or Firm* — Erik K. Johnson

(57) ABSTRACT

An embodiment of the invention may include a method, computer program product and computer system for managing mobile objects. The embodiment may receive an event detected in a geographic space by a mobile object of a plurality of mobile objects. The embodiment may determine a reliability of the event based on a reliability associated with the mobile object. The embodiment may store the event in a mobile object database based on the reliability of the even being above a reference reliability.

19 Claims, 21 Drawing Sheets

(51) Int. Cl.
*G08G 1/0962* (2006.01)
*G08G 1/01* (2006.01)
*G06F 16/29* (2019.01)
*G01S 17/93* (2020.01)

(56) References Cited

U.S. PATENT DOCUMENTS

| | | | |
|---|---|---|---|
| 5,164,904 A | 11/1992 | Sumner | |
| 5,173,691 A | 12/1992 | Sumner | |
| 5,247,439 A | 9/1993 | Gurmu | |
| 5,289,183 A | 2/1994 | Hassett | |
| 5,610,821 A | 3/1997 | Gazis | |
| 6,028,550 A | 2/2000 | Froeberg | |
| 6,115,611 A * | 9/2000 | Kimoto | G01C 21/26 455/456.3 |
| 6,138,163 A | 10/2000 | Nam et al. | |
| 6,150,961 A | 11/2000 | Alewine | |
| 6,317,058 B1 | 11/2001 | Lemelson et al. | |
| 6,480,783 B1 | 11/2002 | Myr | |
| 6,680,674 B1 | 1/2004 | Park | |
| 6,745,021 B1 * | 6/2004 | Stevens | H04M 3/42 455/404.1 |
| 6,906,709 B1 | 6/2005 | Larkin | |
| 7,277,938 B2 | 10/2007 | Duimovich et al. | |
| 7,395,151 B2 | 7/2008 | O'Neill | |
| 7,447,588 B1 | 11/2008 | Xu | |
| 7,466,244 B2 | 12/2008 | Kimchi | |
| 7,480,501 B2 * | 1/2009 | Petite | H04M 11/04 455/404.1 |
| 7,564,377 B2 | 7/2009 | Kimchi | |
| 7,689,348 B2 | 3/2010 | Boss | |
| 7,710,421 B2 | 5/2010 | Muramatsu | |
| 7,788,109 B2 | 8/2010 | Jakobson | |
| 7,899,611 B2 | 3/2011 | Downs | |
| 7,979,172 B2 | 7/2011 | Breed | |
| 8,000,887 B2 | 8/2011 | Nathan | |
| 8,063,766 B2 * | 11/2011 | Daly | G08B 27/005 340/531 |
| 8,103,445 B2 | 1/2012 | Smith | |
| 8,280,451 B1 * | 10/2012 | Zheng | H04M 1/6091 379/88.21 |
| 8,396,652 B2 | 3/2013 | Nomura | |
| 8,428,876 B2 | 4/2013 | Lee | |
| 8,606,727 B2 | 12/2013 | Wu | |
| 8,612,278 B1 | 12/2013 | Ashley, Jr. | |
| 8,620,510 B1 | 12/2013 | Meuth | |
| 8,626,704 B2 | 1/2014 | Sawai | |
| 8,630,958 B2 | 1/2014 | Carlsson | |
| 8,768,012 B2 | 7/2014 | Satoh | |
| 8,793,046 B2 | 7/2014 | Lombrozo | |
| 8,799,246 B2 | 8/2014 | Nomura | |
| 8,818,608 B2 | 8/2014 | Cullinane | |
| 8,843,309 B2 | 9/2014 | Kimchi | |
| 8,850,011 B2 | 9/2014 | Kimchi | |
| 8,850,013 B2 | 9/2014 | Waldman | |
| 8,862,146 B2 | 10/2014 | Shatsky | |
| 8,903,431 B2 | 12/2014 | Koch | |
| 8,903,593 B1 | 12/2014 | Addepalli et al. | |
| 8,930,269 B2 | 1/2015 | He | |
| 8,934,754 B2 | 1/2015 | Billau et al. | |
| 8,938,443 B2 | 1/2015 | Etzion | |
| 8,988,252 B2 | 3/2015 | Scholl | |
| 8,989,053 B1 | 3/2015 | Skaaksrud et al. | |
| 8,995,662 B2 | 3/2015 | Rubin et al. | |
| 9,041,812 B2 | 5/2015 | Billau et al. | |
| 9,058,703 B2 | 6/2015 | Ricci | |
| 9,104,965 B2 | 8/2015 | Fritsch | |
| 9,154,909 B2 | 10/2015 | Fulger et al. | |
| 9,172,398 B2 | 10/2015 | Miyazaki | |
| 9,239,878 B2 * | 1/2016 | Kattil Cherian | G06F 9/54 |
| 9,280,567 B2 | 3/2016 | Fischer | |
| 9,282,145 B2 * | 3/2016 | Wei | H04L 67/10 |
| 9,384,609 B2 | 7/2016 | Ricci | |
| 9,424,521 B2 | 8/2016 | Bloomquist | |
| 9,460,616 B1 | 10/2016 | Miyahira | |
| 9,467,839 B1 | 10/2016 | Nishimura | |
| 9,494,439 B1 | 11/2016 | Ross | |
| 9,497,170 B2 | 11/2016 | Akiyama | |
| 9,497,590 B1 | 11/2016 | Gotoh | |
| 9,497,591 B1 | 11/2016 | Gotoh | |
| 9,507,808 B2 | 11/2016 | Fischer | |
| 9,513,134 B1 | 12/2016 | Ishikawa | |
| 9,538,327 B1 | 1/2017 | Gotoh | |
| 9,562,775 B2 | 2/2017 | Gotoh | |
| 9,576,482 B2 | 2/2017 | Yamamoto | |
| 9,578,093 B1 | 2/2017 | Gotoh | |
| 9,584,977 B2 | 2/2017 | Yamamoto | |
| 9,615,215 B2 | 4/2017 | Yuen et al. | |
| 9,638,533 B2 | 5/2017 | Gotoh | |
| 9,639,537 B2 | 5/2017 | Gotoh | |
| 9,640,073 B2 | 5/2017 | Gueziec | |
| 9,646,402 B2 | 5/2017 | Gotoh | |
| 9,646,493 B2 | 5/2017 | Yamamoto | |
| 9,659,016 B2 | 5/2017 | Gotoh | |
| 9,668,103 B1 | 5/2017 | Edwards et al. | |
| 9,674,812 B2 | 6/2017 | Skaaksrud et al. | |
| 9,678,986 B2 | 6/2017 | Hancock et al. | |
| 9,681,104 B2 | 6/2017 | Billau et al. | |
| 9,868,394 B1 | 1/2018 | Fields et al. | |
| 9,868,446 B1 | 1/2018 | Zhu et al. | |
| 9,882,818 B2 | 1/2018 | Shao et al. | |
| 2001/0029425 A1 | 10/2001 | Myr | |
| 2002/0058520 A1 * | 5/2002 | Nakagawa | G01C 21/26 455/456.3 |
| 2002/0161833 A1 | 10/2002 | Niven | |
| 2005/0027434 A1 | 2/2005 | Hirose | |
| 2005/0065711 A1 | 3/2005 | Dahlgren | |
| 2005/0195821 A1 | 9/2005 | Yun et al. | |
| 2005/0222933 A1 | 10/2005 | Wesby | |
| 2006/0015254 A1 * | 1/2006 | Smith | H04W 4/024 702/3 |
| 2006/0158330 A1 | 7/2006 | Gueziec | |
| 2007/0067373 A1 | 3/2007 | Higgins | |
| 2007/0109303 A1 | 5/2007 | Muramatsu | |
| 2007/0208492 A1 | 9/2007 | Downs | |
| 2007/0208496 A1 | 9/2007 | Downs et al. | |
| 2007/0225912 A1 | 9/2007 | Grush | |
| 2007/0241932 A1 | 10/2007 | Otero | |
| 2008/0046134 A1 | 2/2008 | Bruce | |
| 2008/0088480 A1 | 4/2008 | Rozum | |
| 2008/0114530 A1 | 5/2008 | Petrisor | |
| 2008/0148383 A1 * | 6/2008 | Pitchaikani | H04L 67/20 726/12 |
| 2008/0248815 A1 | 10/2008 | Busch | |
| 2008/0255754 A1 | 10/2008 | Pinto | |
| 2009/0070024 A1 | 3/2009 | Burchard | |
| 2009/0167597 A1 | 7/2009 | Strachan | |
| 2009/0210477 A1 | 8/2009 | White | |
| 2009/0248758 A1 | 10/2009 | Sawai | |
| 2009/0254971 A1 | 10/2009 | Herz et al. | |
| 2009/0282125 A1 | 11/2009 | Jeide | |
| 2009/0287405 A1 | 11/2009 | Liu | |
| 2009/0327918 A1 | 12/2009 | Aaron | |
| 2010/0011031 A1 | 1/2010 | Huang et al. | |
| 2010/0036578 A1 | 2/2010 | Taguchi | |
| 2010/0036595 A1 | 2/2010 | Coy | |
| 2010/0063715 A1 | 3/2010 | Wynter et al. | |
| 2010/0069035 A1 | 3/2010 | Johnson | |
| 2010/0087981 A1 | 4/2010 | Orozco-Perez | |
| 2010/0100310 A1 | 4/2010 | Eich | |
| 2010/0188265 A1 | 7/2010 | Hill | |
| 2010/0199213 A1 | 8/2010 | Suzuki | |
| 2011/0037619 A1 | 2/2011 | Ginsberg | |
| 2011/0047230 A1 | 2/2011 | McGee | |
| 2011/0137557 A1 | 6/2011 | De Los | |
| 2011/0191011 A1 | 8/2011 | McBride | |
| 2011/0205040 A1 | 8/2011 | Van Wiemeersch | |
| 2011/0208419 A1 | 8/2011 | Boss et al. | |
| 2011/0285591 A1 | 11/2011 | Wong | |
| 2011/0301770 A1 | 12/2011 | Rutman | |
| 2012/0035839 A1 | 2/2012 | Stehle et al. | |
| 2012/0041675 A1 | 2/2012 | Juliver | |
| 2012/0065871 A1 | 3/2012 | Deshpande et al. | |
| 2012/0089326 A1 | 4/2012 | Bouve | |

(56) References Cited

U.S. PATENT DOCUMENTS

| | | |
|---|---|---|
| 2012/0092187 A1 | 4/2012 | Scholl |
| 2012/0136561 A1 | 5/2012 | Barker et al. |
| 2012/0291049 A1 | 11/2012 | Park |
| 2012/0303222 A1 | 11/2012 | Cooprider |
| 2012/0323438 A1 | 12/2012 | Wendel |
| 2013/0002477 A1 | 1/2013 | Dehnie |
| 2013/0006531 A1 | 1/2013 | Gee |
| 2013/0006925 A1 | 1/2013 | Sawai |
| 2013/0013203 A1 | 1/2013 | Sumizawa |
| 2013/0030699 A1 | 1/2013 | Barnes |
| 2013/0079964 A1 | 3/2013 | Sukkarie |
| 2013/0104231 A1 | 4/2013 | Niner |
| 2013/0141247 A1 | 6/2013 | Ricci |
| 2013/0179382 A1 | 7/2013 | Fritsch |
| 2013/0204524 A1 | 8/2013 | Fryer |
| 2013/0214939 A1 | 8/2013 | Washlow |
| 2013/0219039 A1 | 8/2013 | Ricci |
| 2013/0305357 A1 | 11/2013 | Ayyagari |
| 2013/0321397 A1 | 12/2013 | Chen |
| 2013/0332571 A1* | 12/2013 | Hoshing ............... G06Q 10/06 709/217 |
| 2014/0032015 A1 | 1/2014 | Chun et al. |
| 2014/0075004 A1 | 3/2014 | Van Dusen et al. |
| 2014/0089243 A1 | 3/2014 | Oppenheimer |
| 2014/0089375 A1 | 3/2014 | Poornachandran |
| 2014/0104077 A1 | 4/2014 | Engel et al. |
| 2014/0120953 A1 | 5/2014 | Ingram |
| 2014/0136099 A1 | 5/2014 | Choi |
| 2014/0191858 A1 | 7/2014 | Morgan |
| 2014/0195214 A1 | 7/2014 | Kozloski |
| 2014/0236414 A1 | 8/2014 | Droz |
| 2014/0248899 A1 | 9/2014 | Emadzadeh |
| 2014/0277918 A1 | 9/2014 | Kim |
| 2014/0278026 A1 | 9/2014 | Taylor |
| 2014/0278029 A1 | 9/2014 | Tonguz |
| 2014/0278074 A1 | 9/2014 | Annapureddy et al. |
| 2014/0278573 A1* | 9/2014 | Cook ................ G06F 16/256 705/4 |
| 2014/0289267 A1 | 9/2014 | Felix |
| 2014/0306834 A1 | 10/2014 | Ricci |
| 2014/0310788 A1* | 10/2014 | Ricci ................ B60Q 1/00 726/6 |
| 2014/0344896 A1* | 11/2014 | Pak ................ G06F 21/74 726/4 |
| 2014/0365644 A1 | 12/2014 | Tanaka |
| 2015/0032418 A1 | 1/2015 | Akiyama |
| 2015/0051822 A1 | 2/2015 | Joglekar |
| 2015/0066284 A1 | 3/2015 | Yopp |
| 2015/0088835 A1 | 3/2015 | Davis |
| 2015/0112570 A1 | 4/2015 | Schmüdderich |
| 2015/0120083 A1 | 4/2015 | Gurovich |
| 2015/0127388 A1 | 5/2015 | Oldham |
| 2015/0149019 A1 | 5/2015 | Pilutti |
| 2015/0160023 A1 | 6/2015 | Goel et al. |
| 2015/0179077 A1 | 6/2015 | Morgan |
| 2015/0212642 A1* | 7/2015 | Kim ................ H04B 1/3838 345/173 |
| 2015/0226858 A1 | 8/2015 | Leibner |
| 2015/0227553 A1 | 8/2015 | Dobre |
| 2015/0266455 A1 | 9/2015 | Wilson |
| 2015/0279122 A1 | 10/2015 | Lorenzen |
| 2015/0279182 A1 | 10/2015 | Kanaujia |
| 2015/0333992 A1 | 11/2015 | Vasseur |
| 2015/0349917 A1 | 12/2015 | Skaaksrud |
| 2015/0360692 A1 | 12/2015 | Ferguson |
| 2015/0371352 A1 | 12/2015 | Boss et al. |
| 2015/0375752 A1 | 12/2015 | Carlsson |
| 2016/0028632 A1 | 1/2016 | Vasseur |
| 2016/0042239 A1 | 2/2016 | Fowe |
| 2016/0061625 A1 | 3/2016 | Wang |
| 2016/0069695 A1 | 3/2016 | Broadbent |
| 2016/0076905 A1 | 3/2016 | Broadbent |
| 2016/0078756 A1 | 3/2016 | Basalamah |
| 2016/0092317 A1 | 3/2016 | Akiyama |
| 2016/0097649 A1 | 4/2016 | Broadbent |
| 2016/0112201 A1 | 4/2016 | Misawa et al. |
| 2016/0119419 A1 | 4/2016 | Choi |
| 2016/0133130 A1 | 5/2016 | Grimm et al. |
| 2016/0138930 A1 | 5/2016 | Akiyama |
| 2016/0189044 A1 | 6/2016 | Pan et al. |
| 2016/0203651 A1 | 7/2016 | Heath et al. |
| 2016/0212229 A1 | 7/2016 | McGavran |
| 2016/0212601 A1 | 7/2016 | Braun et al. |
| 2016/0245660 A1 | 8/2016 | Winckler |
| 2016/0351053 A1 | 12/2016 | Jung et al. |
| 2016/0358479 A1 | 12/2016 | Riedelsheimer |
| 2016/0360485 A1* | 12/2016 | McGavran ........... G06F 16/2358 |
| 2016/0370185 A1 | 12/2016 | Gotoh |
| 2016/0370190 A1 | 12/2016 | Gotoh |
| 2016/0370195 A1 | 12/2016 | Gotoh |
| 2016/0370469 A1 | 12/2016 | Mabuchi |
| 2016/0371120 A1 | 12/2016 | Gotoh |
| 2016/0371281 A1 | 12/2016 | Gotoh |
| 2016/0371299 A1 | 12/2016 | Gotoh |
| 2016/0371323 A1 | 12/2016 | Gotoh |
| 2016/0371326 A1 | 12/2016 | Gotoh |
| 2016/0371864 A1 | 12/2016 | Gotoh et al. |
| 2016/0371975 A1 | 12/2016 | Yamamoto |
| 2016/0373449 A1 | 12/2016 | Haga et al. |
| 2017/0010111 A1 | 1/2017 | Gotoh et al. |
| 2017/0010112 A1 | 1/2017 | Gotoh et al. |
| 2017/0012812 A1 | 1/2017 | Gotoh et al. |
| 2017/0026858 A1 | 1/2017 | McKee |
| 2017/0067764 A1 | 3/2017 | Skupin et al. |
| 2017/0068857 A1* | 3/2017 | Lee ................ H04N 5/23293 |
| 2017/0084175 A1 | 3/2017 | Sedlik |
| 2017/0178505 A1 | 6/2017 | Ishikawa et al. |
| 2017/0228410 A1 | 8/2017 | Slusar |
| 2017/0264619 A1* | 9/2017 | Narayanaswamy ........... H04L 63/0281 |
| 2017/0278409 A1 | 9/2017 | Johnson et al. |
| 2017/0352200 A1 | 12/2017 | Wang et al. |
| 2018/0022328 A1 | 1/2018 | Tochigi et al. |
| 2018/0053404 A1 | 2/2018 | Horita et al. |
| 2018/0068495 A1* | 3/2018 | Chainer ................ G07C 5/008 |
| 2018/0083914 A1* | 3/2018 | Yamaura ............... H04W 12/12 |
| 2018/0189913 A1 | 7/2018 | Knopp et al. |
| 2018/0342113 A1* | 11/2018 | Kislovskiy ............ G07C 5/008 |

FOREIGN PATENT DOCUMENTS

| | | |
|---|---|---|
| CN | 102798854 A | 11/2012 |
| CN | 102997928 A | 3/2013 |
| CN | 103247176 A | 8/2013 |
| CN | 103258043 A | 8/2013 |
| CN | 103854072 A | 6/2014 |
| CN | 103971529 A | 8/2014 |
| CN | 104480722 A | 9/2015 |
| DE | 10030819 A1 | 1/2002 |
| DE | 102005020154 A1 | 11/2006 |
| EP | 1914701 A2 | 4/2008 |
| JP | 11083511 A | 3/1999 |
| JP | 2001028004 A | 1/2001 |
| JP | 2003004468 A | 1/2003 |
| JP | 2007286706 A | 11/2007 |
| JP | 2008003829 A | 1/2008 |
| JP | 2008123325 A | 5/2008 |
| JP | 2008262418 A | 10/2008 |
| JP | 2008294921 A | 12/2008 |
| JP | 2009277078 A | 11/2009 |
| JP | 4985119 B2 | 7/2012 |
| JP | 2012155286 A | 8/2012 |
| JP | 2012207919 A | 10/2012 |
| JP | 2012233800 A | 11/2012 |
| JP | 2013045242 A | 3/2013 |
| JP | 2014065362 A | 4/2014 |
| JP | 2014075008 A | 4/2014 |
| JP | 2014095663 A | 5/2014 |
| JP | 2015018396 A | 1/2015 |
| JP | 2015081057 A | 4/2015 |
| KR | 101354607 B1 | 8/2013 |
| WO | WO-2007140527 A1 | 12/2007 |

(56) References Cited

FOREIGN PATENT DOCUMENTS

| WO | 2011081157 A1 | 7/2011 |
|---|---|---|
| WO | WO-2013167085 A2 | 11/2013 |
| WO | WO-2016203385 A1 | 12/2016 |

OTHER PUBLICATIONS

International Searching Authority, "Notification of Transmittal of the International Search Report and the Written Opinion of the International Searching Authority, or the Declaration," Patent Cooperation Treaty, Oct. 17, 2018, 9 Pages, International Application No. PCT/IB2018/054409.
Dictionary.com, "pertain", 2018, p. 1.
Microsoft Computer Dictionary, 5th Edition, 2002, p. 228, "function".
Merriam-Webster Dictionary, "Candidate", 2017, p. 1.
Microsoft Computer Dictionary, "Object" 5th Edition, 2002, p. 372.
Pending U.S. Appl. No. 15/903,084, filed Feb. 23, 2018, entitled: "Management of Mobile Objects", pp. 1-69.
IBM: List of IBM Patents or Patent Applications Treated as Related (Appendix P), Mar. 2, 2018, pp. 1-2.
Pending U.S. Appl. No. 15/855,408, filed Dec. 27, 2017, entitled: "Management of Mobile Objects", pp. 1-68.
Pending U.S. Appl. No. 15/855,238, filed Dec. 27, 2017, entitled: "Management of Mobile Objects", pp. 1-71.
Pending U.S. Appl. No. 15/855,159, filed Dec. 27, 2017, entitled: "Management of Mobile Objects", pp. 1-69.
IBM, "List of IBM Patents or Patent Applications Treated as Related (Appendix P)," Jul. 14, 2017, p. 1-2.
U.S. Appl. No. 15/628,762, entitled "Management of Mobile Objects", filed Jun. 21, 2017, 69 Pages.
U.S. Appl. No. 15/628,787, entitled "Management of Mobile Objects", filed Jun. 21, 2017, 69 Pages.
U.S. Appl. No. 15/629,089, entitled "Management of Mobile Objects", filed Jun. 21, 2017, 72 Pages.
U.S. Appl. No. 15/628,828, entitled "Management of Mobile Objects", filed Jun. 21, 2017, 71 Pages.
U.S. Appl. No. 15/628,797, entitled "Management of Mobile Objects", filed Jun. 21, 2017, 72 Pages.
U.S. Appl. No. 15/483,415, entitled "Management of Moving Objects", filed Apr. 10, 2017, 59 Pages.
Abrougui et al., "Efficient load balancing and QoS-based location aware service discovery protocol for vehicular ad hoc networks," EURASIP Journal on Wireless Communications and Networking, Mar. 2012, p. 1-15, Springer.
Aulinas et al., "Local map update for large scale SLAM," Electronics Letters, Apr. 15, 2010, p. 1-2, vol. 46, No. 8.
Carson et al., "GPS Spoofing Detection and Mitigation Using Cooperative Adaptive Cruise Control System," IEEE Intelligent Vehicles Symposium (IV), Jun. 19-22, 2016, p. 1091-1096, Gothenburg, Sweden.
Dangel et al., "Can Road Traffic Volume Information Improve Partitioning for Distributed SUMO?," Modeling Mobility with Open Data, Lecture Notes in Mobility, 2015, p. 61-74, Springer International Publishing.
DRM, "Local Dynamic Map," DRM Research Seminar, Jun. 30, 2010., p. 1-72, Japan Digital Road Map Association.
Furuichi et al., "Information Sharing Among Mobile Apparatus," Application and Drawings, filed Jan. 24, 2017, 53 Pages, U.S. Appl. No. 15/413,560.
Gotoh et al., "Geographic Space Management," Application and Drawings, filed Mar. 2, 2017, 93 Pages, U.S. Appl. No. 15/447,594.
Gotoh et al., "Management of Mobile Objects," Application and Drawings, filed Dec. 16, 2015, 65 Pages, U.S. Appl. No. 14/970,631.
He et al., "Sharing Trajectories of Autonomous Driving Vehicles to Achieve Time-Efficient Path Navigation," IEEE Vehicular Networking Conference, 2013, p. 119-126.

Hong et al., "A grid-based node split algorithm for managing current location data of moving objects," The Journal of Supercomputing, Dec. 2007, p. 321-337, vol. 42, Issue 3, Springer.
Hsu et al., "Automatic Traffic Monitoring Method Based on Cellular Model," Fifth International Conference on Intelligent Information Hiding and Multimedia Signal Processing, 2009, p. 640-643, IEEE Computer Society.
IEEE, "Server—Definition," IEEE 100: The Authoritative Dictionary of IEEE Standards Terms, 2000, p. 1031, Seventh Edition.
IEEE, "System—Definition," IEEE 100: The Authoritative Dictionary of IEEE Standards Terms, 2000, p. 1143-1144, Seventh Edition.
Ihm et al., "Advanced Spatial Data Management for Enterprise Applications," An Oracle White Paper, Aug. 2010, p. 1-16, Oracle Spatial 11g.
International Searching Authority, "Notification of Transmittal of the International Search Report and the Written Opinion of the International Searching Authority, or the Declaration," Patent Cooperation Treaty, Sep. 21, 2016, 11 Pages, International Application No. PCT/IB2016/053523.
Ishikawa et al., "Management of Mobile Objects and Resources," Application and Drawings, filed Mar. 1, 2017, 56 Pages, U.S. Appl. No. 15/446,359.
Ishikawa et al., "Management of Mobile Objects and Resources," Application and Drawings, filed Dec. 16, 2015, 52 Pages, U.S. Appl. No. 14/970,626.
Ishikawa et al., "Management of Mobile Objects," Application and Drawings, filed Dec. 16, 2015, 78 Pages, U.S. Appl. No. 14/970,643.
Kattan et al., "Time-Series Event-Based Prediction: An Unsupervised Learning Framework Based on Genetic Programming," Information Sciences, Aug. 17, 2014, p. 1-38.
Liao et al., "Anomaly Detection in GPS Data Based on Visual Analytics," IEEE Symposium on Visual Analytics Science and Technology, Oct. 24-29, 2010, p. 51-58, Salt Lake City, Utah, USA.
Merriam-Webster, "placeholder", Merriam-Webster Dictionary, 2017, 1 Page.
Microsoft, "select," Microsoft Computer Dictionary, 2002, p. 471, 2nd Edition.
Miyahira et al., "Management of Mobile Objects and Service Platform for Mobile Objects," Application and Drawings, filed Jul. 14, 2016, 68 Pages, U.S. Appl. No. 15/210,178.
Miyahira et al., "Management of Mobile Objects and Service Platform for Mobile Objects," Application and Drawings, filed Jul. 14, 2016, 68 Pages, U.S. Appl. No. 15/210,207.
Narayanan et al., "Using Data Analytics to Detect Anomalous States in Vehicles," arXiv AI: Artificial Intelligence, Dec. 25, 2015, p. 1-10, arXiv:1512.08048 [cs.AI], Cornell University Library.
Nishimura et al., "Management of Dynamic Events and Moving Objects," Application and Drawings, filed Sep. 1, 2016, 91 Pages, U.S. Appl. No. 15/254,183.
OpenStreetMap, "QuadTiles," OpenStreetMap Wiki, Last Modified on Mar. 3, 2014, p. 1-10, http://wiki.openstreetmap.org/wiki/QuadTiles, Accessed on Jun. 15, 2015.
Ortelli, "Server-side clustering of geo-points on a map using Elasticsearch," Trifork Blog, Aug. 1, 2013, p. 1-14, http://blog.trifork.com/2013/08/01/server-side-clustering-of-geo-points-on-a-map-using-elasticsearch/, Accessed on Jun. 15, 2015.
Pawlowski et al., "Applying Event Stream Processing on Traffic Problem Detection," Progress in Artificial Intelligence (EPAI), 2009, p. 27-38, LNAI vol. 5816, Springer-Verlag Berlin Heidelberg.
Radin, "Gps Spoofing Detection Using Multiple Antennas and Individual Space Vehicle Pseudoranges," Open Access Master's Theses, 2015, p. 1-99, Paper 528, DigitalCommons@URI, University of Rhode Island.
Schade, "Sharing Data by Means of a Local Dynamic Map," Understanding the Standards for Cooperative ITS, Feb. 6, 2014, p. 1-10, Mines ParisTech, Transportation Sustainability Environment Consulting.
Sun et al., "Moving Object Map Analytics: A Framework Enabling Contextual Spatial-Temporal Analytics of Internet of Things Applications," IEEE International Conference on Service Operations and Logistics, and Informatics (SOLI), 2016, p. 101-106.

(56) References Cited

OTHER PUBLICATIONS

Suzumura et al., "X10-based Massive Parallel Large-Scale Traffic Flow Simulation," ProVISION, Winter 2012, p. 74-79, No. 72, IBM Professionals' Papers.
Y et al., "A Complex Event Processing System Approach to Real Time Road Traffic Event Detection," Journal of Convergence Information Technology (JCIT), Oct. 2013, p. 142-148, vol. 8, No. 15.
Yamamoto, "Management of Moving Objects," Application and Drawings, filed Apr. 10, 2017, 59 Pages, U.S. Appl. No. 15/483,415.
Yang et al., "Detecting Road Traffic Events by Coupling Multiple Timeseries With a Nonparametric Bayesian Method," IEEE Transactions on Intelligent Transportation Systems, Oct. 2014, p. 1936-1946, vol. 15, No. 5.
Yang et al., "Spatio-temporal Coupled Bayesian Robust Principal Component Analysis for Road Traffic Event Detection," Proceedings of the 16th International IEEE Annual Conference on Intelligent Transportation Systems (ITSC 2013), Oct. 6-9, 2013, p. 392-398, IEEE, The Hague, The Netherlands.
Yim et al., "Investigation of Vehicles as Probes Using Global Positioning System and Cellular Phone Tracking: Field Operational Test," California PATH Working Paper, Feb. 2001, p. 1-50, California Path Program Institute of Transportation Studies, University of California, Berkeley, CA.
Yumak et al., "Modelling Multi-Party Interactions among Virtual Characters, Robots, and Humans", Presence: Teleoperators & Virtual Environments, Spring 2014, p. 172-190, vol. 23, No. 2.

\* cited by examiner

Event List

| Edge ID | Event ID | Location | Event Content | Influence Event |
|---|---|---|---|---|
| Edge 0001 | Eve 0214 | Full Length | Speed Limited to 30km/h | Eve 0114(Edge 0002) |
| Edge 0002 | Eve 0114 | 32m from the 1st node | Closure | Eve 0214(Edge 0001), Eve 0421(Edge 0003)... |
| ..... | ..... | ..... | ..... | ..... |
| Edge 1000 | N/A | | | Eve 1201 (edge xxxx) |

*FIG.9*

| Edge ID | Counts | Location | Event Content |
|---|---|---|---|
| Edge 0009 | 2 | Full length | Congestion |
| Edge 0013 | 1 | 15m from the 2$^{nd}$ node | Skid |
| ⋮ | ⋮ | ⋮ | |

Candidate Event List

*FIG. 10*

Notification Event List

| Edge ID | Event ID | Location | Event Content |
|---|---|---|---|
| Edge 0001 | Eve 0214 | Full Length | Speed Limited to 30km/h |
| Edge 0002 | Eve 0114 | 32m from the 1st node | Closure |

*FIG.11*

Candidate Event List

| Edge ID | Counts | Event Reliability | Detection Reliability | Location | Event Content |
|---|---|---|---|---|---|
| Edge 0009 | 2 | 0.98 | 1st:0.98, 2nd:0.98 | Full length | Congestion |
| Edge 0013 | 1 | 0.95 | 0.95 | 15m from the 2nd node | Skid |
| ..... | ..... | ..... | ..... | ..... | ..... |

*FIG.17*

```xml
<ObjectIdentifierRule>
<RuleID>4001</RuleID>
<RuleType>4000</RuleType>
<Name>TEST-Identification</Name>
<Description>TEST-Identification</Description>
<Target>
</Target>
<Condition pattern="identify">
<Count>1</Count>
<ValueCondition>
<Attribute>direction</Attribute>
<Operator>eq</Operator>
<Value>right_low</Value>
</ValueCondition>
<ValueCondition>
<Attribute>color</Attribute>
<Operator>eq_range</Operator>
<Value>#FF8800-FF88FF</Value>
</ValueCondition>
<LocationCondition>
<Lon>-49.19</Lon>
<Lat>12.393</Lat>
<Distance>50.0</Distance>
</LocationCondition>
</Condition>
</ObjectIdentifierRule>
```

I
II
III
IV

FIG. 18

```xml
<Objects>
<Object>
<ObjectType>poll</ObjectType>
<Exist>1</Exist>
<Distance>3m – 4m</Distance>
<ObjectLength>20</ObjectLength>
<LengthAffected>100</LengthAffected>
</Object>
</Objects>
```

FIG. 19

| TYPE | MODEL | SENSING REGION | DETECTION RULE | CORRECTNESS |
|---|---|---|---|---|
| Type A | Mod I 001 | STRAIGHT FORWARD | A | 98% |
| | | FORWARD AND TO THE RIGHT | B | 90% |
| | | FORWARD AND TO THE LEFT | C | 90% |
| | | STRAIGHT BACKWARD | D | 70% |
| | Model A02 | STRAIGHT FORWARD | A | 99% |
| | | FORWARD AND TO THE RIGHT | B | 95% |
| | | FORWARD AND TO THE LEFT | C | 95% |
| | | STRAIGHT BACKWARD | D | 88% |
| ... | | | | |

*FIG.21*

| DRIVER | SENSING REGION | DETECTION RULE | CORRECTNESS |
|---|---|---|---|
| John Smith | STRAIGHT FORWARD | A | 99% |
| | FORWARD AND TO THE RIGHT | B | 83% |
| | FORWARD AND TO THE LEFT | C | 92% |
| | STRAIGHT BACKWARD | D | 86% |
| ... | | | |

MANAGEMENT OF MOBILE OBJECTS

BACKGROUND

The present invention relates to management of the movement of mobile objects.

Driving support and automobile systems receive information by communicating with a plurality of automobiles, acquire event information concerning accidents or obstructions on the road and map this information onto a map along with the position of an automobile. Such systems reference automobile position information, automobile characteristic information, driver characteristic information, and the like, and transmits suitable event information to each automobile.

BRIEF SUMMARY

An embodiment of the invention may include a method, computer program product and computer system for managing mobile objects. The embodiment may receive an event detected in a geographic space by a mobile object of a plurality of mobile objects. The embodiment may determine a reliability of the event based on a reliability associated with the mobile object. The embodiment may store the event in a mobile object database based on the reliability of the even being above a reference reliability.

BRIEF DESCRIPTION OF THE DRAWINGS

FIG. 9 shows an illustrative example of an event list.

FIG. 10 shows an illustrative example of a candidate event list.

FIG. 11 shows an illustrative example of a notification event list.

FIG. 17 shows an exemplary candidate event list in the present embodiment.

FIG. 18 shows an exemplary detection rule.

FIG. 19 shows exemplary data of the detection result.

FIG. 21 shows exemplary statistical information stored in the mobile object database 2300.

FIG. 22 shows another example of statistical information stored in the mobile object database 2300.

DETAILED DESCRIPTION

Embodiments of the present invention will now be described in detail with reference to the accompanying Figures.

Hereinafter, example embodiments of the present invention will be described. The example embodiments shall not limit the invention according to the claims, and the combinations of the features described in the embodiments are not necessarily essential to the invention.

Figure 1:
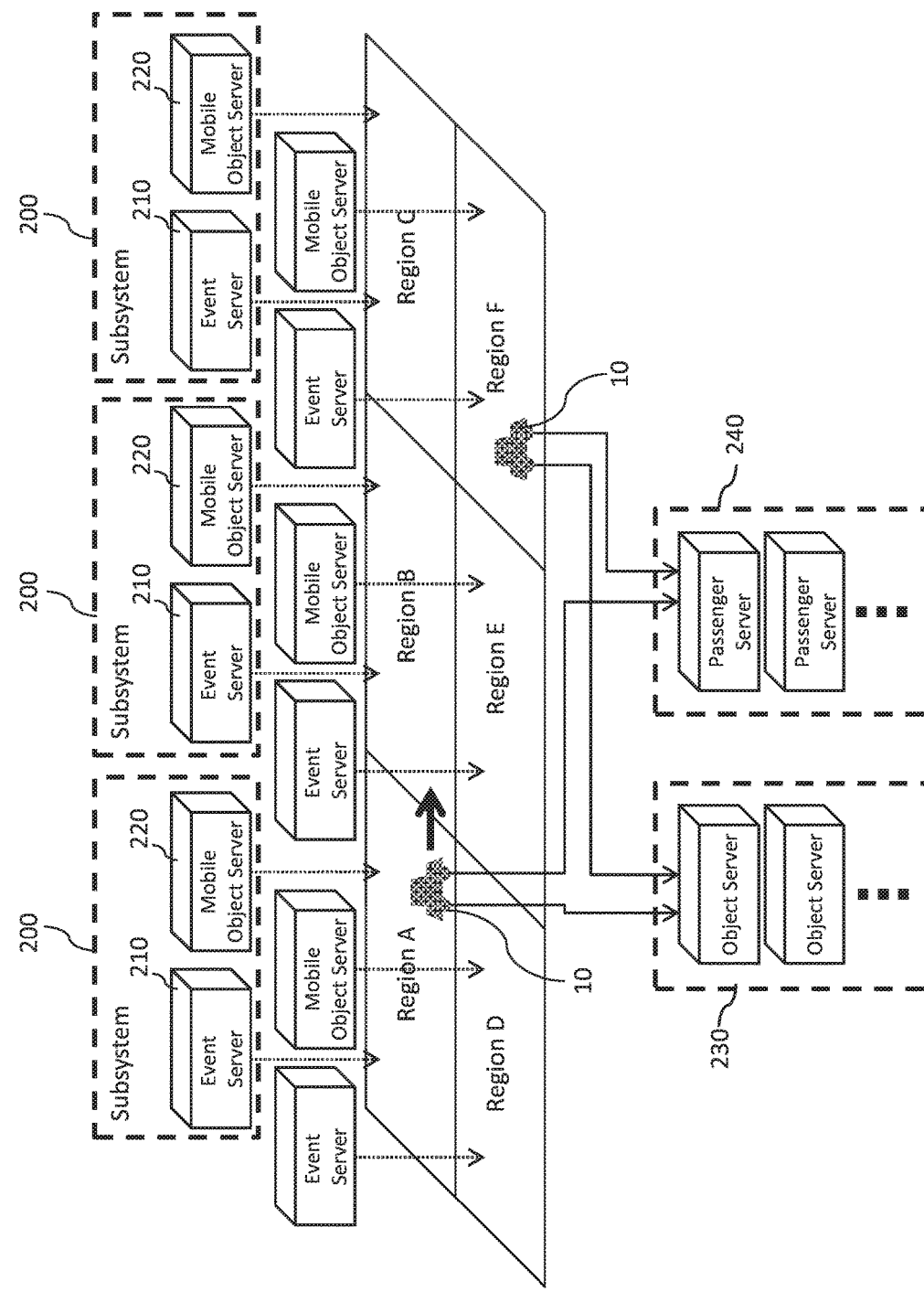
FIG. 1 shows a system 100 according to an embodiment of the present invention and a map area corresponding to a geographic space managed by the system 100.

FIG. 1 shows a system 100 and a map area corresponding to a geographic space managed by the system 100, according to an embodiment of the present invention. The system 100 manages a geographic space that includes routes on which a mobile object 10 moves. The system 100 is operable to divide the geographic space into a plurality of regions and manage these regions. A mobile object 10 may move on routes including land routes, sea routes, and/or air routes, for example. The geographic space may be land, sea, or air space that includes the routes on which the mobile object travels. The mobile objects 10 may be manned/unmanned automobiles, motorbikes, bicycles, humans having a digital device, airplanes, vessels, drones, or the like.

FIG. 1 shows an automobile as an example of the mobile object 10, which moves along roads as examples of land routes. The system 100 includes a plurality of subsystems 200 that respectively manage the plurality of regions. FIG. 1 shows an example in which the map area is divided into six regions from region A to region F, and six subsystems 200 respectively manage these six regions.

System 100 comprises a plurality of event servers 210, a plurality of mobile object servers 220, a plurality of object servers 230, and a plurality of passenger servers 240. According to the embodiment of FIG. 1, each of the subsystems 200 may include at least one of the plurality of event servers 210 and one of the plurality of mobile object servers 220.

The event server 210 manages events occurring in each region of the geographic space. In one embodiment, the event server 210 of subsystem 200 assigned to region A may manage events in region A. The plurality of mobile object servers 220 respectively assigned to a plurality of regions in a geographic space manage the mobile objects 10 in each of the plurality of regions. In one embodiment, the mobile object server 220 assigned to region A may manages mobile objects 10 located in region A. The object server 230 manages information of the mobile objects 10 regardless of the location of the mobile objects 10. The passenger server 240 manages information of at least one passenger riding on the mobile objects 10.

Each of the subsystems 200 may be implemented on one or more servers. In one embodiment, each event server 210 and mobile object server 220 may be implemented on one server. In one embodiment, a set of an event server 210 and a mobile object server 220 in a subsystem 200 may be implemented by one server. Portions of the system 100 other than the subsystems 200 may also be implemented on one or more servers. In one embodiment, each object server 230 and passenger server 240 may be implemented on one server. In another embodiment, a set of object servers 230 and a set of passenger servers 240 may be each implemented by one server. In yet another embodiment, all of the object servers 230 and the passenger servers 240 may be implemented on one server. These servers may exist at any point on a network including the Internet, a subscriber network, a cellular network, or a desired combination of networks. The servers may be computers or other types of data processors, and may be dedicated servers, or may be shared servers that perform other operations.

The system 100 acquires the positions of a mobile object 10 from the mobile object 10, and the mobile object server 220 managing the region that includes the acquired position of the mobile object 10 may manage the movement of this mobile object 10. The system 100 acquires information of events that have occurred to the mobile object 10 and/or on the road outside, and the event server 210 managing the region including the position where such an event has occurred may manage the state of the event.

This event may include information about accidents, obstructions, closure, limitation, status, or construction on the road, or information about the weather, temperature, buildings, shops, or parking lots near the road. In response to a setting or a request from the mobile object 10, the subsystem 200 may provide notification about the event information to the mobile object 10 that made the request. For example, if the mobile object 10 is moving on a route in a geographical area corresponding to region A, then the mobile object sever 220 managing region A provides this mobile object 10 with the notification about the event relating to the route.

Since the map area is divided into a plurality of regions, despite the mobile object 10 simply moving on a route, the region corresponding to the position of the mobile object 10 might change. FIG. 1 shows an example in which the mobile object 10 is driving on a road such that the position of the mobile object 10 moves from region A to region B on the regions. In this case, according to the movement of the mobile object 10, the system 100 may transfer the information concerning the mobile object 10 from the mobile object server 220 managing region A to the mobile object server 220 managing region B, and may also transfer the management of the mobile object 10 to the mobile object server 220 managing region B.

Figure 2:
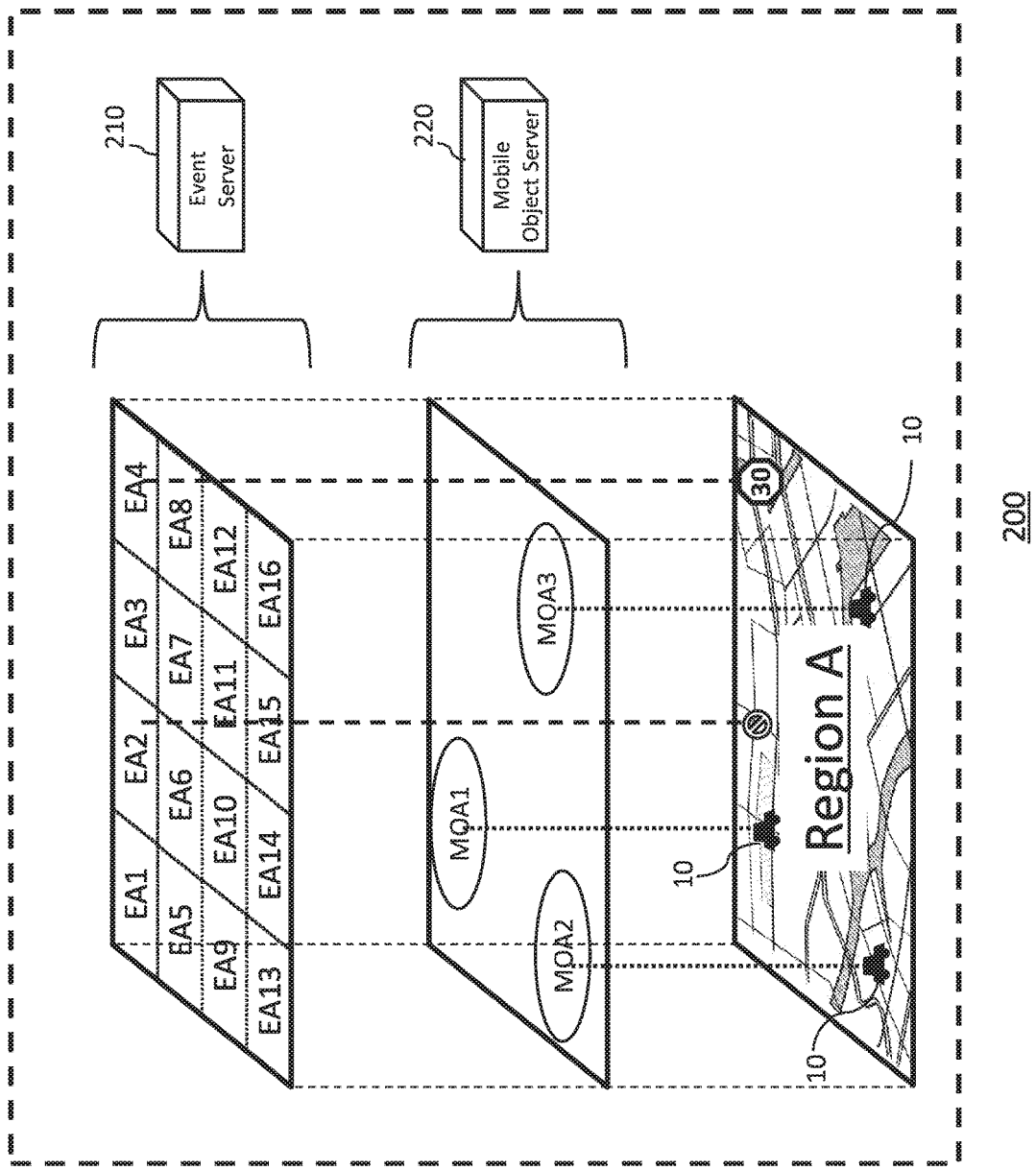
FIG. 2 shows a subsystem 200 according to the embodiment of the present invention and a map area corresponding to a region A managed by the subsystem 200.

FIG. 2 shows a subsystem 200 and a map area corresponding to a region A managed by the subsystem 200, according to an embodiment of the present invention. The event server 210 manages at least one event agent, and executes each event agent to manage events on routes in a region assigned to the event server 210. An "agent" may be a software entity having specific data, and may operable to receive a message (e.g. command), and return a result of the message. Each region of the plurality of regions of geographic space includes at least a portion of one area of the plurality of areas. In this embodiment, the region assigned to the event server 210 is the same as the region assigned to the mobile object server 220. However, in other embodiments, these regions may be different.

In the embodiment of FIG. 2, the region A, which is the region assigned to the event server 210, is divided into 16 areas and 16 areas are assigned to each of the event agents EA1-EA16. The event server 210 executes each of the event agents EA1-EA16 to manage events occurring on routes of each area of region A. For example, the event agent EA2 may manage a "closure" event on an area corresponding to EA2 on the map, and the event agent EA4 may manage a "speed limit" event on an area corresponding to EA4 as shown in FIG. 2.

The plurality of mobile object servers 220 may include at least one mobile object server 220 including one or more mobile object agents, each of which is assigned to each of the mobile objects 10. In the embodiment of FIG. 2, the mobile object server 220 includes three mobile object agents MOAs 1-3 assigned to three mobile objects 10 in the assigned region A. The mobile object server 220 executes each of the mobile object agents MOA1-MOA3 to manage the mobile objects 10 traveling on the region A.

Figure 3:
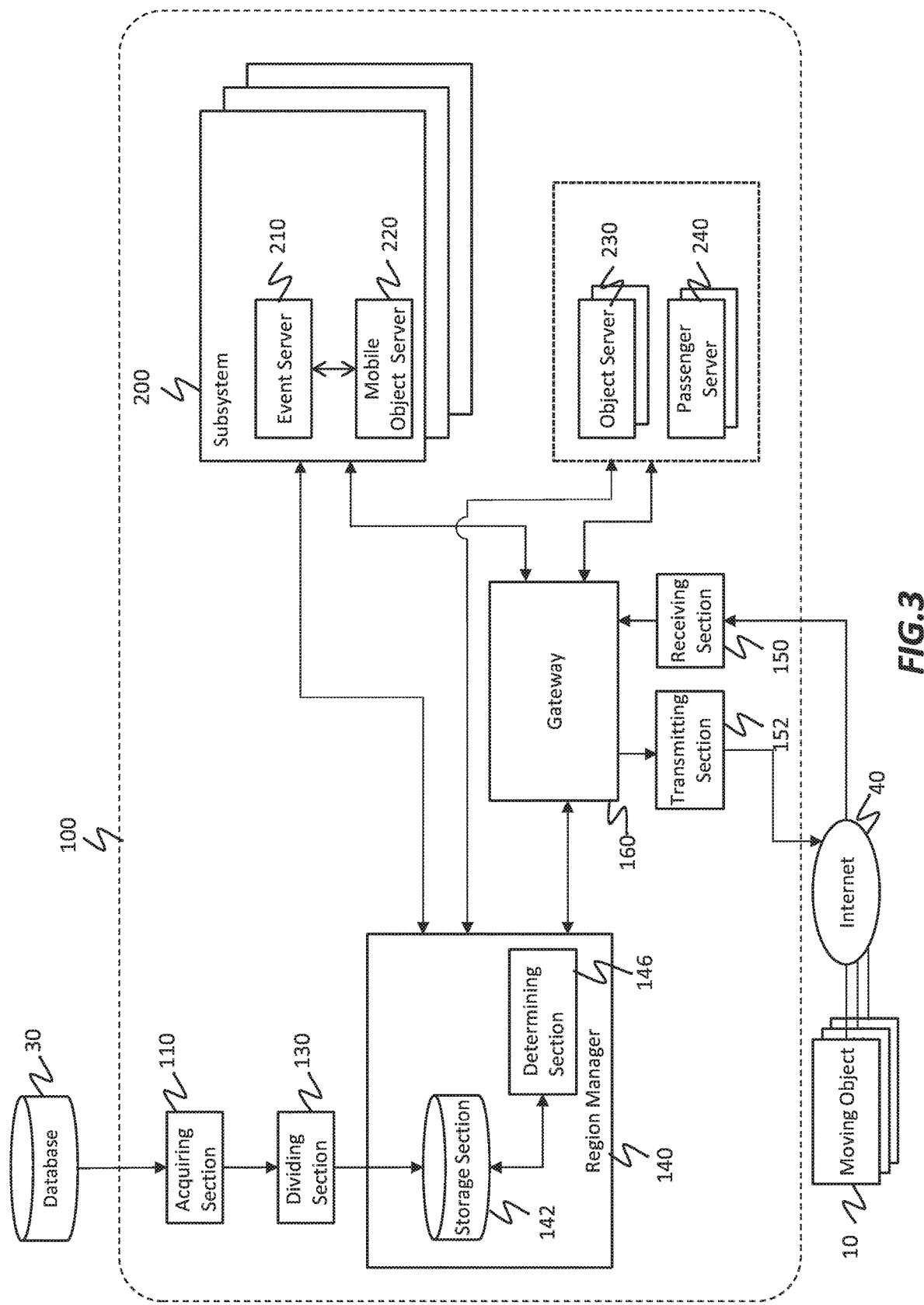
FIG. 3 shows a first exemplary configuration of the system 100 according to the present embodiment.

FIG. 3 shows an exemplary configuration of the system 100, according to an embodiment of the present invention. The system 100 may be operable to communicate with each of a plurality of mobile objects 10 to send and receive the information used to manage the mobile objects 10. The system 100 may be operable to acquire map data and/or information exchanged with the mobile objects 10, through the Internet, a subscriber network, a cellular network, or any desired combination of networks. The system 100 includes an acquiring section 110, a dividing section 130, a region manager 140, a receiving section 150, a transmitting section 152, a gateway apparatus 160, a plurality of subsystems 200, a plurality of object servers 230, and a plurality of passenger servers 240.

The acquiring section 110 may be operable to acquire map data corresponding to the geographical areas where a mobile object 10 is positioned, from an external database 30, for example. In response to the map being updated, the acquiring section 110 may acquire some or all of the updated map data. The acquiring section 110 may be operable to acquire the map data from the Internet, a subscriber network, a cellular network, or any desired combination of networks. The system 100 may be operable to store the map data in advance.

The acquiring section 110 may further acquire an event that has occurred within the geographic space to be managed by the system 100. In this case, the acquiring section 110 may acquire, accident information, traffic information, weather information, time information, etc.

The dividing section 130 may be operable to communicate with the acquiring section 110 and divide the map area into a plurality of regions. In this embodiment, the dividing section 130 generates two groups of regions by dividing an original map area into a plurality of regions.

The region manager 140 may be operable to store information concerning the plurality of regions including the regions resulting from the division. The region manager 140 may be operable to specify the subsystem 200 managing the region that includes the position of the mobile object 10, in response to receiving the position of the mobile object 10. The region manager 140 may be implemented on one or more servers.

The storage section 142 may be operable to communicate with the dividing section 130 and store information concerning the plurality of first regions and the plurality of second regions resulting from the division by the dividing section 130. The storage section 142 may store setting values or the like of the system 100.

The storage section 142 may store intermediate data, calculation results, threshold values, parameters, and the like that are generated by or used in the operations of the system 100. In response to a request from any component within the system 100, the storage section 142 may supply the data stored therein to the component making the request. The storage section 142 may be a computer readable storage medium such as an electric storage device, a magnetic storage device, an optical storage device, an electromagnetic storage device, or a semiconductor storage device.

The determining section 146 may be operable to communicate with the storage section 142, and determine one region from the plurality of regions (e.g., regions A-F of FIG. 1) in which each of the mobile objects 10 is located based on the position information of the mobile object 10 and geographic information of the plurality of regions. The determining section 146 may identify a route or position in the map area managed by the system 100 that corresponds to the position information of the mobile object 10.

The determining section 146 may store the position information of this mobile object 10 and/or information of the determined region in the storage section 142, in association with this mobile object 10. The determining section 146 may store a history of the position information of this mobile object 10 and/or a history of the determined mobile object server 220 in the storage section 142. The determining section 146 may be a circuit, a shared or dedicated computer readable medium storing computer readable program instructions executable by a shared or dedicated processor, etc.

The receiving section 150 may be operable to receive information transmitted from each of a plurality of mobile objects 10. Each mobile object 10 may transmit information at designated time intervals, and the receiving section 150 may sequentially receive this transmitted information. In this embodiment, the receiving section 150 may receive car probe data from each mobile object 10 as the information. The car probe data may include information detected by the mobile object 10, such as position information of the mobile object 10.

In one embodiment, the position information may include longitude and latitude (and optionally altitude information) of the mobile object 10 in an absolute coordinate system. In another embodiment, the mobile object 10 may determine its location in the absolute coordinate system by using GPS, and the determining section 146 receiving the position information may determine a route on which the mobile object 10 exists and a specific location of the route at which the mobile object 10 exists based on the position information. Alternatively, the mobile object 10 may include such detailed position information in the car probe data.

The receiving section 150 may communicate with the plurality of mobile objects 10 and receive the car probe data of each mobile object 10, via the Internet 40. The receiving section 150 may receive the car probe data of the plurality of mobile objects 10 through wireless communication, a subscriber network, a cellular network, or any desired combination of networks.

The transmitting section 152 may be operable to transmit event information to each of the mobile objects 10 according to settings, for example. The transmitting section 152 may transmit information concerning the route on which the mobile object 10 is expected to travel. The transmitting section 152 may communicate with the mobile objects 10 and transmit each type of information to the mobile objects 10 via the Internet 40. The transmitting section 152 may transmit each type of information to the mobile objects 10 through wireless communication, a subscriber network, a cellular network, or any desired combination of networks.

The gateway apparatus 160 may be operable to transfer communication between the plurality of subsystems 200 and the plurality of mobile objects 10. The gateway apparatus 160 may communicate with the receiving section 150 and receive the information transmitted by each mobile object 10.

The gateway apparatus 160 may communicate with the region manager 140 and demand the transfer destination for each piece of information received from the mobile objects 10, of the region manager 140. In response to this request, the gateway apparatus 160 may receive from the region manager 140 the information of the subsystem 200 managing the region on which the mobile object 10 exists. The gateway apparatus 160 may transfer the information received from the mobile object 10 to the subsystem 200 that is to manage the mobile object 10. In other words, the gateway apparatus 160 may transfer the information received from each mobile object 10 to the subsystem 200 determined by the region manager 140.

The gateway apparatus 160 may communicate with each of the subsystems 200, and receive the information transmitted by each subsystem 200. The gateway apparatus 160 may communicate with the transmitting section 152 and supply the transmitting section 152 with the information received from each subsystem 200, such that this information is transferred to the mobile objects 10 designated for each subsystem 200.

The gateway apparatus 160 may include a plurality of gateway devices, and may quickly perform transfer between the plurality of subsystems 200 and the plurality of mobile objects 10. In this case, the receiving section 150 may function as a load balancer that supplies the information from the mobile objects 10, such that the load is spread among the plurality of gateways. The load balancer may sequentially supply information from the mobile objects 10 to the gateways having lighter loads. The gateway apparatus 160 may be a network that provides a connection between a plurality of networks using the same or different types of protocols.

A plurality of subsystems 200 may be operable to communicate with the region manager 140 and the gateway apparatus 160 and to respectively manage a plurality of regions in a geographic space. Each subsystem 200 is operable to manage mobile objects 10 that travel routes in its managing region and to manage events on its managing region.

As described, each subsystem 200 may include the event server 210 and the mobile object server 220. The event server 210 manages events occurring on its managing region with the plurality of the event agents. In one embodiment, the event server 210 may perform, through the event agent, (i) registration, update and/or deletion of events, (ii) registration, update and/or deletion of candidate events, and (iii) provision of event information.

The mobile object server 220 manages the plurality of the mobile objects 10 traveling on its managing region with the plurality of the mobile object agents. In one embodiment, the mobile object server 220 may perform, through the mobile object agent, (i) processing of the car probe data, (ii) update of information of the mobile object, and (iii) provision of information to the mobile object. For example, the mobile object server 220 may execute the mobile object agent to collect information of events from at least one event server 210, and provide the mobile object 10 with information that assists the mobile object 10 with traveling in the geographic space.

A plurality of object servers 230 including at least one object server 230 may communicate with the gate way 160 and include an object agent (OA) containing information of the mobile object 10. An object agent may correspond to each mobile object 10 and contain information thereof. In one embodiment, the object agent may contain (i) information, by region, of which subsystem currently manages a mobile object agent of the mobile object 10, (ii) an identification (ID) of the mobile object 10, (iii) an ID of a passenger of the mobile object 10, and (iv) a characteristic of the mobile object 10 (e.g., model/version information, width, length, and/or height of the mobile object 10).

The object server 230 may perform, through the object agent, (i) provision and/or update of information of the mobile object 10, (ii) registration, update, and/or deletion of the ID of passenger riding on the mobile object 10, (iii) provision and/or update of the information of the region of the mobile object 10, and (iv) provision of information needed for generation of a new mobile object agent by the mobile object server 220.

At least one passenger server 240 of a plurality of passenger servers may communicate with the gateway apparatus 160, and include a passenger agent that contains information of at least one passenger. A passenger agent may correspond to each passenger or candidate passenger of mobile objects 10, and contain information thereof. In one embodiment, the object agent may contain an ID of a passenger and a characteristic of the passenger (e.g., information of age, gender, type, and the like of license of the passenger). The passenger server 240 may perform, through the passenger agent, provision and/or update of information of the passengers.

As described above, the system 100 of the present embodiment may manage the mobile objects by utilizing the mobile object agents in each mobile object server 220, and manage the events by utilizing the event agent in each event server 210. According to the system 100 of the embodiment, the system 100 can separately manage information relating to the mobile objects 10 and events on the geographic map with a plurality of kinds of servers. Furthermore, the plurality of mobile object servers 220 can smoothly transfer the management of the mobile objects 10 traveling across the regions via the mobile object agents, thereby improving the efficiency of the whole system 100. In addition, according to the system 100 of the embodiment, each event server 210 divides event management in one region among the plurality of event agents and provides the mobile object agent with event information, thereby improving the efficiency of event management in the region (e.g., improving response time of event search) and thus event notification to the mobile objects 10. In addition, the system 100 can provide the mobile object agent with information of mobile object 10 by the object agent of the object server 230. The system 100 can also provide the mobile object agent with information of passengers of the mobile objects 10 by the passenger agent of the passenger server 240.

Figure 4:
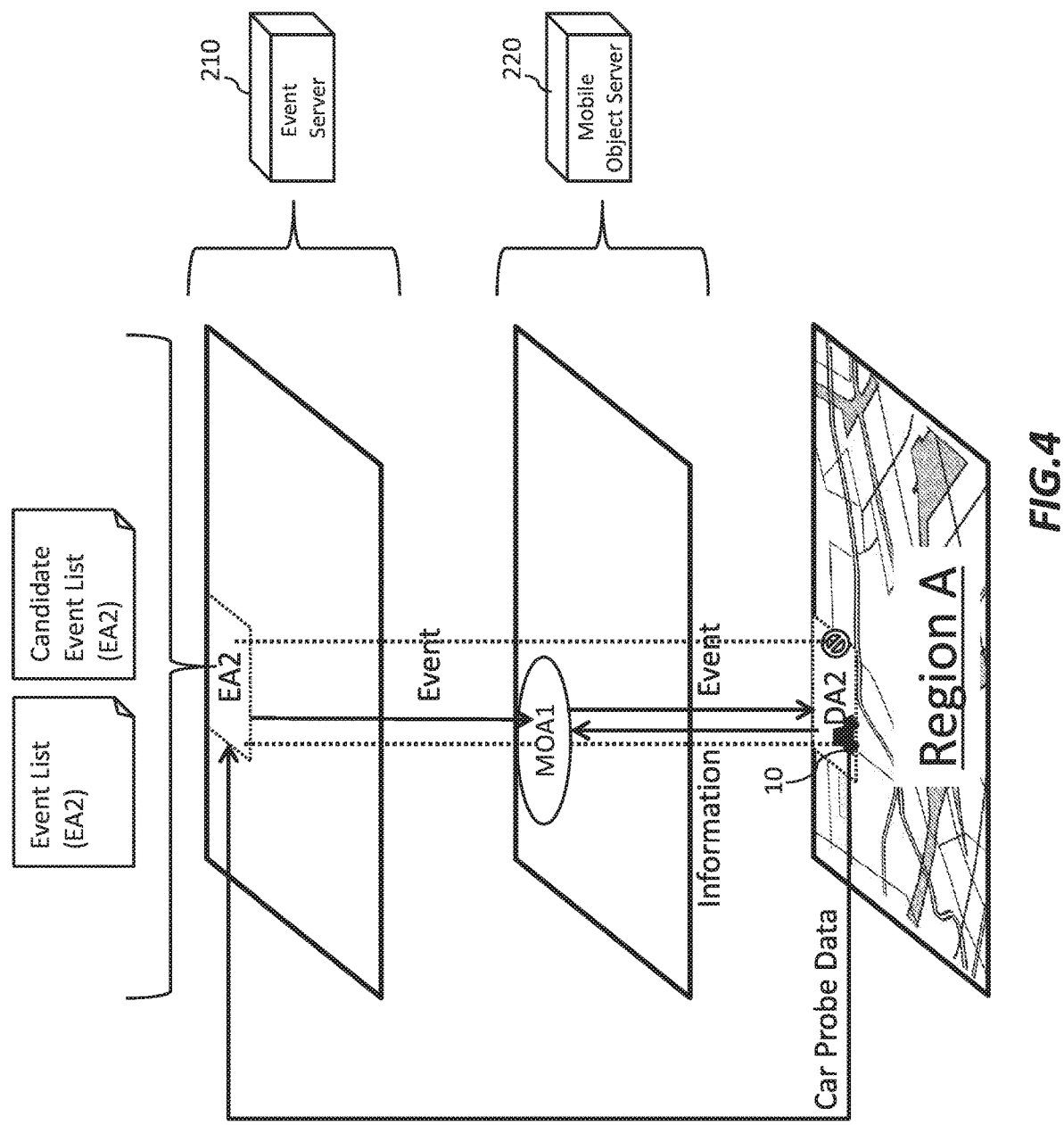
FIG. 4 shows management of events by the event server 210 and the mobile object server 220 according to one embodiment.

FIG. 4 shows management of events by the event server 210 and the mobile object server 220, according to an embodiment of the present invention. In this embodiment, a mobile object 10 is traveling on a target route on region A and transmitting a car probe data including the position information to the event server 210 managing region A with the car probe data via a gateway apparatus, such as the gateway apparatus 160. The event server 210 manages event information through each event agent based on the car probe data from the mobile objects on region A. For example, each event agent may manage an event list (containing information of an event and an influence event for routes on the area managed by the event agent) and a candidate event list (containing information of candidates of an event for routes on the area managed by the event agent).

In the embodiment of FIG. 4, the event agent EA2 manages events of an area (indicated as "DA2" on the region A of FIG. 4) by the event list of the event agent EA2 and the candidate event list of the event agent EA2 based on car probe data from the mobile object 10 on the area DA2. For example, the event agent EA2 assigned to the area DA2 is executable to generate an event based on the information from the mobile object 10.

In one embodiment, each mobile object server 220 is operable to receive information from the mobile object 10 in the region A assigned to the mobile object server 220. The mobile object server 220 determines the target route where the mobile object 10 is located. The mobile object server 220 sends the information to one event server 210 assigned to a region A where the mobile object 10 is located, and thereby requests the event agent EA2 assigned to the area DA2 where the target route is located to send an event list containing information of an event on the target route and the influence event of the target route.

The mobile object server 220 executes the mobile object agent MOA1 for the mobile object 10 to provide the mobile object 10 with information that assists the mobile object 10 with traveling in the area DA2 based on the information of the event on the other route and the influence event of the target route. In the embodiment of FIG. 4, the mobile object agent MOA1 receives, from the event agent EA2, the event information of the route on which the mobile object 10 exists, and provides the mobile object 10 with the event information (e.g., information of closure).

Figure 5:
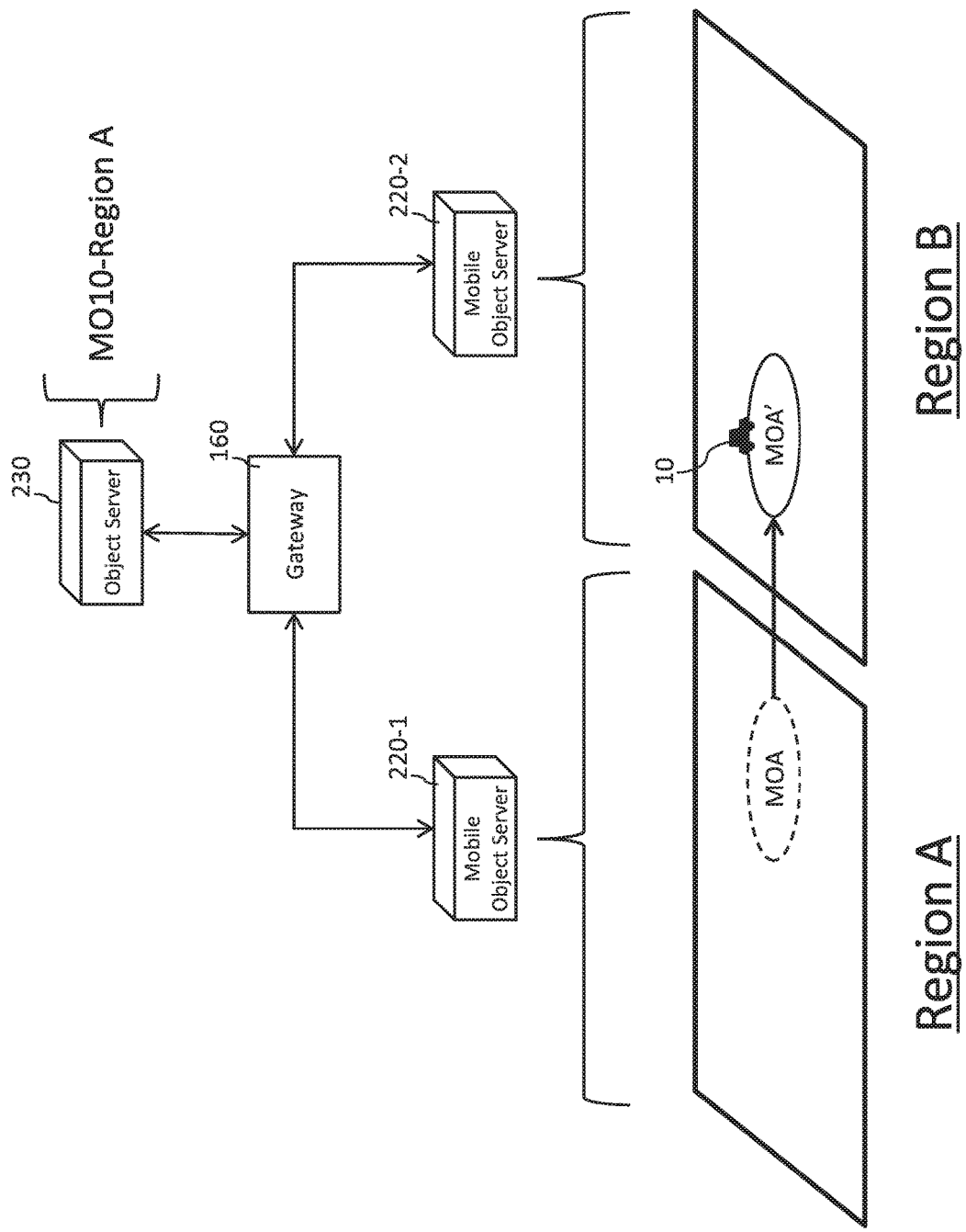
FIG. 5 shows management of mobile object by the mobile object server 220 and object server 230 according to one embodiment.

FIG. 5 shows management of a mobile object 10 by the mobile object servers 220 and object server 230, according to an embodiment of the present invention. The mobile object server 220-1 may transfer the mobile object agent to the mobile object server 220-2 assigned to a neighboring region in response to the mobile object 10 moving to the neighboring region. In this embodiment, in response to a mobile object 10 traveling from region A to region B, the mobile object server 220-1 managing region A deletes the mobile object agent MOA for the mobile object 10, and a mobile object server 220-2 managing region B generates a mobile object agent MOA for the mobile object 10.

In this embodiment, the object agent 230 may store information that includes a mobile object server identifier MOS-ID that identifies one of the plurality of mobile object servers 220 executing the mobile object agent corresponding to the object agent 10. Just after the mobile object 10 arrives at region B, the mobile object server 220-2 has not been executing the mobile object agent for the mobile object 10. The mobile object server 220-2 is operable to receive information from the mobile object 10 in the region B assigned to the mobile object server 220-2.

Using the information from the mobile object 10, the mobile object server 220-2 obtains the mobile object server identifier MOS-ID from the object server 230 that manages the object agent for the mobile object 10 because the mobile object server 220-2 is not executing the mobile object agent for the mobile object 10. The mobile object server 220-2 requests a mobile object server 220-1 identified by the mobile object server identifier MOS-ID to transfer the mobile object agent for the mobile object 10. Then the mobile object server 220-1 managing region A transfers the mobile object agent to the mobile object server 220-2 assigned to a neighboring region B in response to the request.

Figure 6:
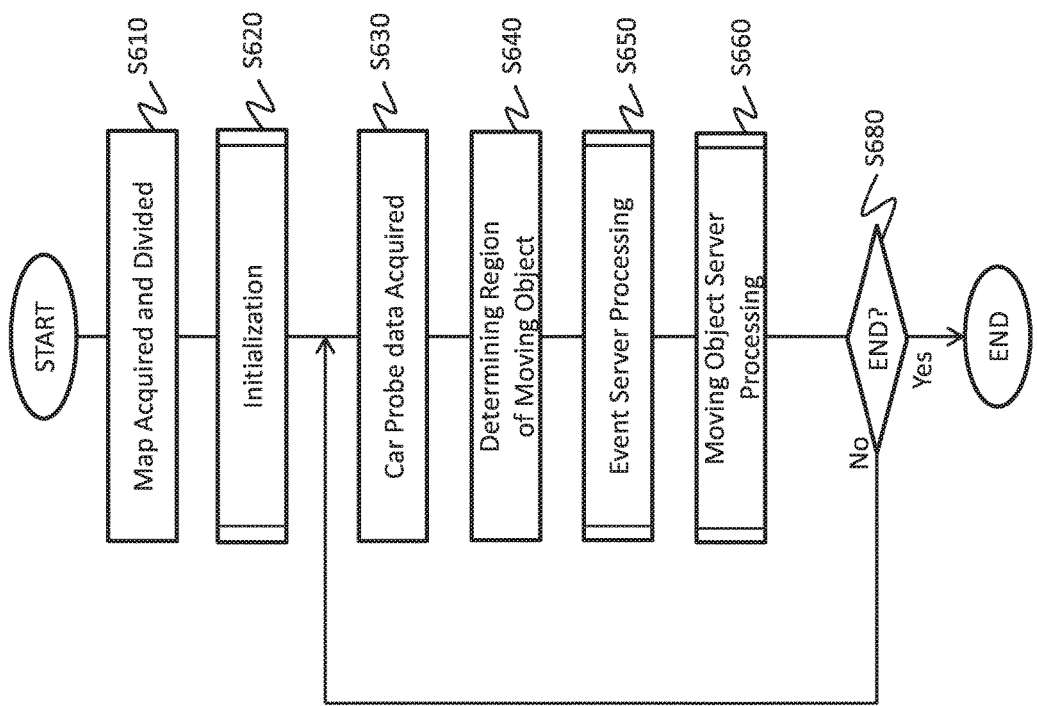
FIG. 6 shows an operational flow of an exemplary configuration of the system 100 according to the present embodiment.

FIG. 6 shows an operational flow of a system, according to an embodiment of the present invention. The present embodiment describes an example in which the system 100 performs the operations from S610 to S680 shown in FIG. 6 to manage mobile objects, such as mobile object 10, and events on a map area. FIG. 6 shows one example of the operational flow of the system 100 shown in FIGS. 1-5, but the system 100 shown in FIGS. 1-5 is not limited to using this operational flows explained below. Also, the operational flow in FIG. 6 may be performed by other systems.

First, an acquiring section, such as the acquiring section 110, may acquire the map data of the geographic space to be managed by the system (S610). The acquiring section may acquire map data of a geographic space that includes one or more cities, one or more towns, and the like. The acquiring section may include map data of a geographic space including one or more states, countries, continents, etc. A dividing section, such as the dividing section 130, may divide the map area to generate a plurality of regions.

Next, the system may perform an initialization process for the mobile object (S620). The system may perform the process of S620 if a user (passenger) initializes a setting of a mobile object and any passengers of the mobile object, before starting to drive the mobile object.

After S620, a gateway apparatus, such as the gateway apparatus 160, of the system may acquire a car probe data from the mobile object (S630). Although the system may acquire the car probe data from the plurality of the mobile objects, the system acquiring a car probe data from one mobile object (which, may be referred to as "a target mobile object") is explained in the below description. The car probe data may include information detected by the target mobile object, such as current position information of the target mobile object, a speed and/or direction of the target mobile object, and event information observed by the target mobile object (e.g., occurrence of ABS, detection of obstacles, or the like). In one embodiment, the position information may include an edge ID of an edge on which the target mobile object exists and the distance between the current location of the target mobile object and the one end of the edge.

Next, the gateway apparatus may determine a region on which the target mobile object is traveling based on the position information of the car probe data of the target mobile object (S640). In one embodiment, the gateway apparatus may inquire a region manager, such as the region manager 140, about the region on which the moving exists. A determining section, such as the determining section 146, of the region manager may determine the region the target mobile object and provide the gateway apparatus with the information of the region of the target mobile object. The gateway apparatus may provide an event server, such as the event server 210, that manages the determined region and a mobile object server, such as the mobile object server 220, that manages the determined region with the car probe data.

Next, the event server that is provided with the car probe data of the target mobile object may process events for the mobile objects (S650). The event server may manage event information based on the car probe data for notification of events to the target mobile object.

After S650, the mobile object server that is provided with the car probe data of the target mobile object may manage a mobile object agent for the target mobile object (S660).

After S660, the system determines whether to end the process for the target mobile object (S680). In one embodiment, the gateway apparatus may determine whether the car probe date indicates the engine stop of the target mobile object. If the system determines not to end the process, then the system proceeds with the process of S630 for the target mobile object. If the system determines to end the process, then the system ends the process for the target mobile object, and may continue the process for other mobile objects.

As described above, the system manages mobile objects by utilizing mobile object agents realized by the plurality of the mobile object servers. Since the system can transfer the mobile object agent between the mobile object servers, it can efficiently manage the mobile objects traveling around the plurality of regions. Furthermore, the system collects car probe data from the mobile objects and manages events generated from the car probe data by utilizing the event agents. Since each event server divides a number of events occurring on its managing regions into a plurality of areas by utilizing the event agents, it can efficiently handle event information.

The process of S610 may be performed once before starting processes S620-S680. The process of S620-S680 may be performed for every mobile object.

Figure 7:
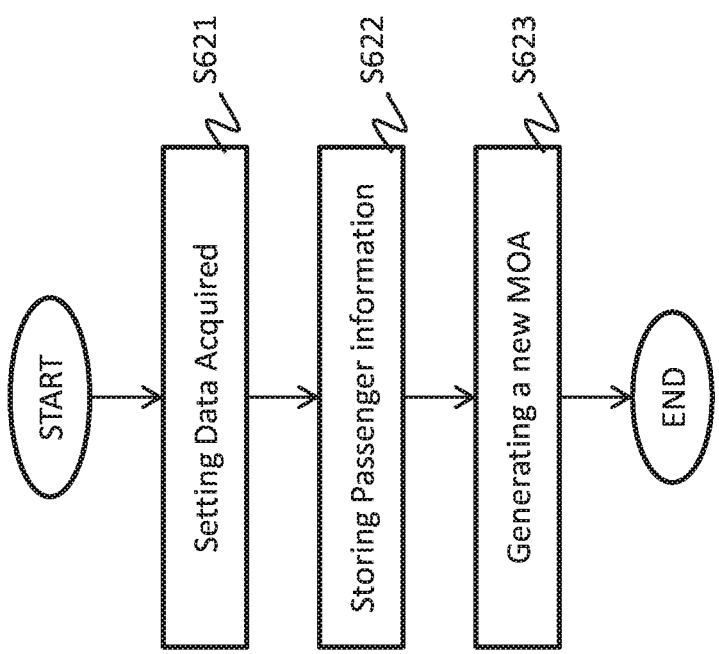
FIG. 7 shows an operational flow of S620 according to the present embodiment.

FIG. 7 shows an operational flow of an initialization process for a mobile object, according to an embodiment of the present invention. The present embodiment describes an example in which the system performs an initialization process, such as the initialization process of S620 of FIG. 6, through processes S621 to S623 shown in FIG. 7.

First, a gateway apparatus receives a setting data (including an ID of the mobile object, an ID(s) of passenger(s) and position information of the mobile object) from the mobile object (S621). The gateway apparatus determines one mobile object server that manages the mobile object based on the position information of the mobile object. The gateway apparatus provides the determined mobile object server with the setting data. Then, the determined mobile object server obtains information (e.g., ID(s) of the passenger(s)) of at least one passenger of the mobile object from the setting data of the mobile object.

Then, the mobile object server may request the object agent of the object server for the mobile object to store the information of the at least one passenger of the mobile object (S622). For example, each mobile object may be mapped to each object agent of the object servers based on values of the IDs of the mobile objects, and the mobile object server may identify one object agent corresponding to the ID of the mobile object based on the calculation using the ID. Then, the mobile object server may provide the object server managing the identified object agent with the setting data including the position information, the ID of the mobile object, and ID(s) of passenger(s) of the mobile object via the gateway apparatus.

Next, the object server stores the information of passenger(s) on an object agent. In one embodiment, each of passengers may be preliminarily mapped to each of the passenger servers based on values of the IDs of passengers, and the passenger servers may have information of passengers. The object server may identify one passenger server corresponding to the ID of a passenger based on the calculation using the ID. The object server may receive, via the gateway apparatus, the information of passengers from the passenger server corresponding to the ID. Then, the object server may store or update the information of the mobile object and the passengers of the mobile object, in the object agent for the mobile object. The object server may include the information of a region that the mobile object currently exists, in the object agent.

Next, the mobile object server 220 managing the region in which the mobile object 10 exists generates a new mobile object agent for the mobile object 10 (S623). In one embodiment, the mobile object server 220 may copy the information of the object agent for the mobile object 10 to the newly generated mobile object agent. For example, the mobile object server 220 may store the information of the mobile object 10 and the information of the at least one passenger of the mobile object 10 in the newly generated mobile object agent for the mobile object 10.

Figure 8:
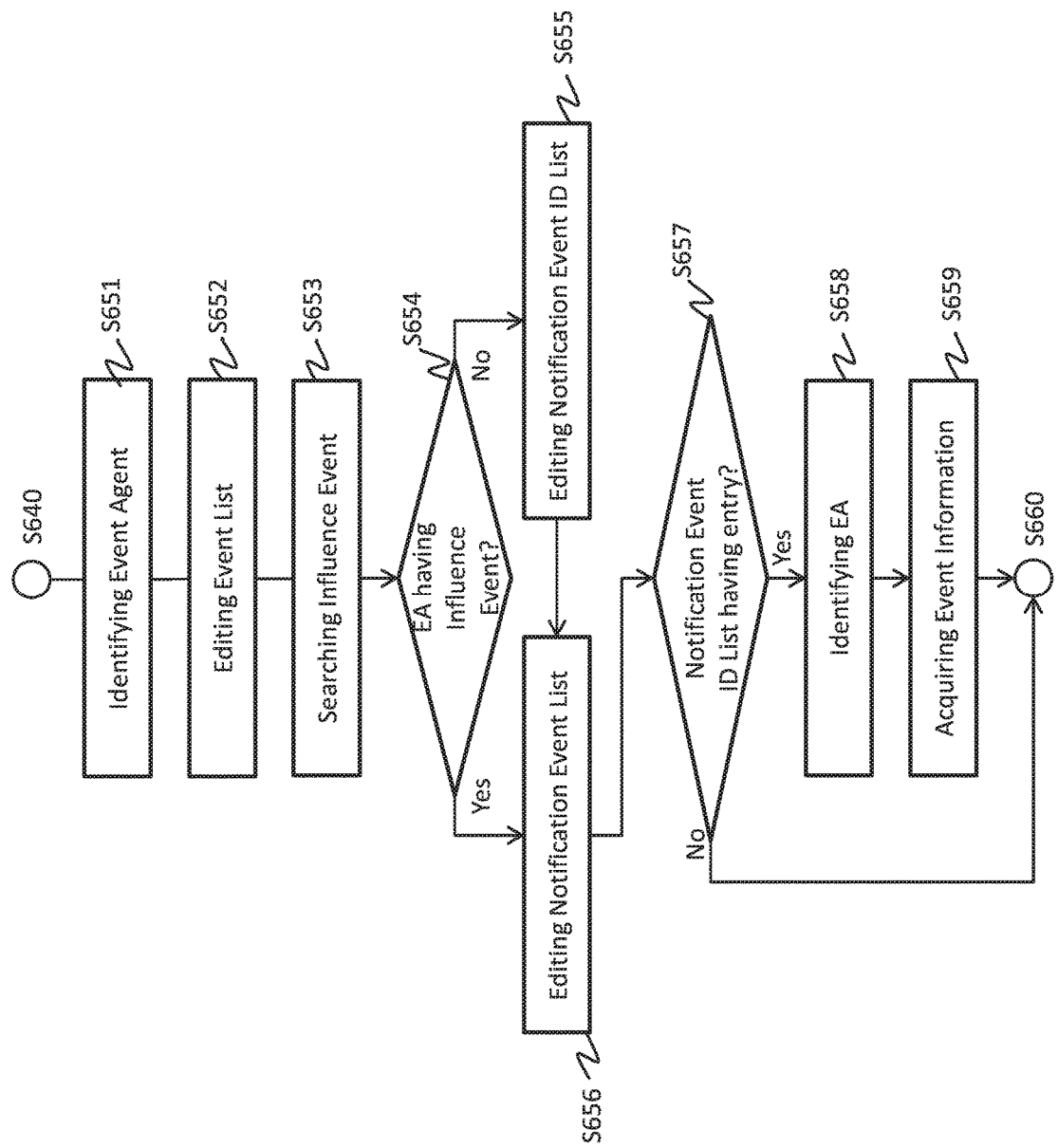
FIG. 8 shows an operational flow of S650 according to the present embodiment.

FIG. 8 shows an operational flow of event processing, according to an embodiment of the present invention. The present embodiment describes an example in which the system performs event processing, such as the event processing of S650 of FIG. 6, through processes S651 to S659 shown in FIG. 8.

First, the event server may identify an event agent (S651). In one embodiment, the event sever determines one event agent from the plurality of event agents based on the position information of the target mobile object. The determined event agent may be referred to as "target event agent." For example, the event server determines a target route (or an edge of the map data) of the target mobile object based on the position information and the map data, and selects, as a target event agent, an event agent that manages an area including the target route of the target mobile object indicated by the car probe data. In another embodiment, the car probe data of a target mobile object may include the information of the target route of the target mobile object.

Next, the event server may edit event lists by the target event agent based on the car probe data (S652). In one embodiment, the target event agent may generate or update information of events (e.g., an edge that an event occurs, an event ID, a location of an event, and content of event) of the target route on the event list based on information of the car probe data. The event of the target route may be referred to as a "target event."

Next, the event server may search, by the target event agent, an influence event on the target route on the area of the target event agent based on the car probe data (S653). The influence event of the target route relates to an event on another route within a threshold distance (e.g., a threshold travelling distance of the target route, a threshold number of edges away from the target route, and/or a threshold travelling time from the target route).

In one embodiment, the target event agent itself may search routes (or edge IDs) apart from the target route within the threshold distance based on the topology information of routes in the regions, or may request other entities (e.g., a server) to search for routes (or edge IDs).

Next, the event server may determine whether the event list of the target event agent includes event entries corresponding to all influence events of the target route searched at S653 (S654). In one embodiment, the target event agent determines whether edges of the influence events are listed as edge IDs of events in the event list.

If an area managed by a target event agent includes the routes (edges) of all influence events relating to an event, then an event list of the target event agent includes corresponding event entries of all influence events. However, if the routes (edges) of any influence events are managed by other event agents, then the event list may not include corresponding event entries of all influence events. If the decision is positive, then the event server proceeds with the process S655 and if negative, the event server proceeds with the process S656.

At S655, the event server may edit a notification event ID list by the target event agent. The notification event ID list includes IDs of influence events and edge IDs of the influence events that are determined to be not included in the event list of the target event agent at S654. In other words, the notification event ID list is a list of event IDs of influence events that are not managed by the target event agent. Then, the event server may proceed with the process of S656.

At S656, the event server may edit a notification event list for the target mobile object, by the target event agent. The notification event list is a list of events that may be helpful to the target mobile object traveling on the target route. The notification event list may include target events and influence events of the target events. The target event agent may add entries of the target events and the influence events in its managing event list for notification.

Next, the event server determines, by the target event agent, whether the notification event ID list has at least one entry (S657). If the decision is positive, then the event server proceeds with the process of S658, and if negative, then the event server ends the process of S650.

At S658, the event server may identify, by the target event agent, an event agent that manages an event list including events in the notification event ID list. The determined event agent may be referred to as "remote event agent."

Next, the event server may acquire information of events in the notification event ID list (S659), and end the process S650. In one embodiment, the target event agent may receive information of events in the notification event ID list from the remote event agent, and edit the notification event list based on the acquired information. In another embodiment, the target event agent may add entries of the influence events in the notification event ID list based on the acquired information.

FIG. 9 shows an illustrative example of an event list, according to an embodiment of the present invention. As described in FIG. 9, the event list may include edge IDs of events, event IDs of events, locations of events, specific contents of events, and influence events relating to events. In this embodiment, each route is represented as "edge." For example, this event list indicates that an event (identified as "Eve 0214") has occurred along the full length of edge 0001 on the area, that the event has limited the speed to 30 km/h, and that edge 0001 includes an influence event identified as "Eve 0114." The event list also indicates that an event (identified as "Eve 0114" on edge 0002) has occurred 32 m from the 1st node on edge 0002 on the area, that the event is a closure of a route, and that edge 0001 includes influence events identified as "Eve 0214" on edge 0001, "Eve 0421" on edge 0003, etc. In one embodiment, the target event agent may add a new entry corresponding to an event detected by the car probe data, in the event list.

According to the first entry in the event list of FIG. 9, the edge 0001 has influence event Eve 0114. This may mean that a mobile object traveling on the edge 0001 is influenced by the event Eve 0114 that has occurred apart from edge 0001 within a threshold distance. In response to receiving the car probe data including the position information indicating that the target mobile object is traveling on the edge 0001, the target event agent searches and obtains routes (edge IDs) apart from the target route (edge 0001) within the threshold distance, and then finds neighboring edge 0002 as a result. In response to receiving the car probe data including the position information of the edge 0001, the target event agent determines whether the edge of influence event (edge 0002) corresponding to the target route is listed as edge IDs in the event list.

The target event agent assigned to the area may generate or update a candidate event based on information from the target mobile object. In one embodiment, the target event agent may generate or update candidate events on the candidate event list including information of a plurality of edges on the area of the event agent based on information of the car probe data.

Although the event list of FIG. 9 includes information of influence events, the information of the influence events may be managed by another list. In one embodiment, the event agent may manage both a first event list containing information of an event on the target route and a second event list containing information of the influence event.

FIG. 10 shows an illustrative example of a candidate event list, according to an embodiment of the present invention. As described in FIG. 10, the event list may include edge IDs of candidate events, counts of detecting candidate events, locations of candidate events, and specific contents of candidate events for each candidate event. For example, this candidate event list indicates that evidence of an event (congestion) has been observed twice along the full length of edge 0009 on the area, and that evidence of an event (skid) has been observed once at a point 15 m from the 2nd node on edge 0013 on the area.

The target event agent may determine whether to change a candidate event in the candidate event list to an event in the event list. In one embodiment, the target event agent may upgrade the candidate event to the event based on information from other mobile objects. In this case, the target event agent counts occurrences of a candidate event observed by a plurality of mobile objects (including the target mobile object and other mobile objects). If the count of a candidate event exceeds a threshold value, then the target event agent determines that the candidate event is upgraded to an event. In one embodiment, in response to the upgrade, the target event agent deletes the entry of the candidate event from the candidate event list, and generates a new entry of an event corresponding to the deleted candidate event. The event servers may set the same or different criteria for upgrading candidate events among the plurality of event agents.

FIG. 11 shows an illustrative example of a notification event list, according to an embodiment of the present invention. As described in FIG. 11, the notification event list may include edge IDs of target/influence events, event IDs of target/influence events, locations of target/influence events, and specific contents of target/influence events. For example, this notification event list indicates that an event (speed limit) has occurred along the full length of edge 0001 on the area, and that an event (closure) has occurred at a point 32 m from the 1st node on edge 0002 on the area.

Figure 12:
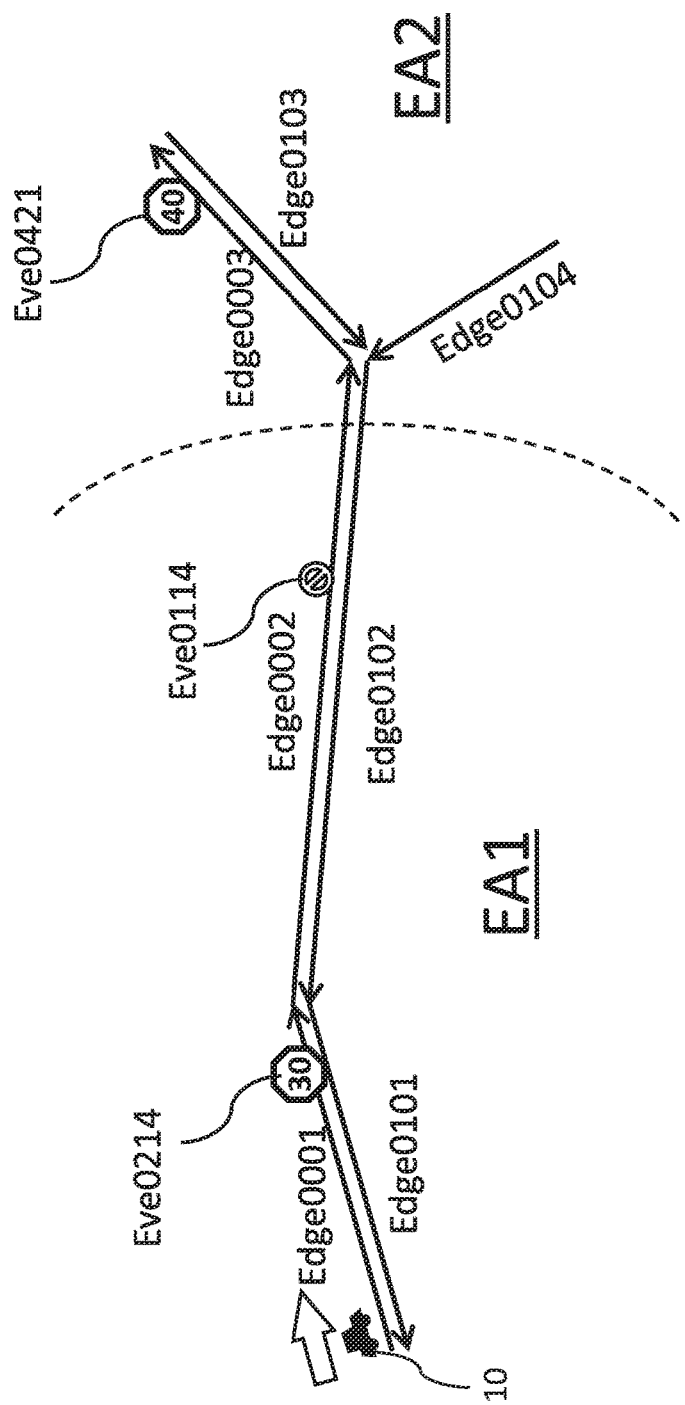
FIG. 12 shows a mobile object 10 and events according to one embodiment.

FIG. 12 shows a mobile object and events, according to an embodiment of the present invention. In the embodiment of FIG. 12, the target mobile object 10 is traveling eastbound on the edge 0001, which is the target route. The target event agent EA1 manages an area including the edge 0001, the edge 0002, the edge 0101, and the edge 0102, and the neighboring event agent EA2 manages an area including the edge 0003, the edge 0103, and the edge 0104.

Direction dependent edges are described in FIG. 12. However, edges may not be direction dependent according other embodiments, and in such embodiments, the event agent may manage events, candidate events, and influence events with direction information. The target event agent EA1 manages an event (Eve 0214) on the edge 0001 as the target event in the event list. Since the edge 0002 is apart from the edge 0001 within the threshold distance, the target event agent EA1 also manages an event (Eve 0114) on the edge 0002 as an influence event in the event list. The target event agent EA1 manages a notification event list including the target event (Eve 0214) and the influence event (Eve 0114) for the target mobile object 10.

In the embodiment of FIG. 12, the mobile object agent managing target mobile object requests the event agent EA1 that manages the target event (e.g., Eve 0214) and the influence event (e.g., Eve 0114) to send the notification event list including the target event and the influence event. In another embodiment, the mobile object agent may request the remote event agent EA2 that manages the information of influence event(s) (e.g., Eve 0421) to send a notification event list containing information of the influence event(s) if the influence event is located outside of the area including the target route (Edge 0001).

Figure 13:
FIG. 13 shows an operational flow of S660 according to the present embodiment.

FIG. 13 shows an operational flow of mobile object processing, according to an embodiment of the present invention. The present embodiment describes an example in which the system manages the target mobile object, such as in S660 of FIG. 6, through processes S661 to S669 shown in FIG. 13.

At S661, the mobile object server may determine whether the mobile object agent for the target mobile object exists in the region determined to be the region of the mobile object, such as the region determined at S640. In other words, the mobile object server determines whether the mobile object server manages the mobile object agent of the target mobile object. If the decision is positive, then the mobile object server proceeds with the process S667, and if negative, the mobile object server proceeds with the process S662.

At S662, the mobile object server may identify an object server that includes the object agent containing the information of the target mobile object. In one embodiment, the mobile object server may identify the object server in the same manner described in S622.

Next, at S663, the mobile object server may inquire the object server 230 identified at S662 for the location of the mobile object agent of the target mobile object. The object server may refer to the object agent of the target mobile object, obtain information of the mobile object server that currently manages the mobile object agent MOA of the target mobile object, if it exists, and provide the mobile object server with the information.

Next, the mobile object server may determine whether the mobile object agent for the target mobile object exists in any other regions. In other words, the mobile object server may determine which mobile object server manages the mobile object agent for the target mobile object from the plurality of mobile object servers managing other regions, at S663. If the decision is positive, then the mobile object server proceeds with the process S666, and if negative the mobile object server proceeds with the process S665.

At S665, the mobile object server generates a new mobile object agent MOA for the target mobile object. The mobile object server may generate the mobile object agent MOA for the target mobile object by obtaining information of the target mobile object from the object server that includes the object agent containing the information of the target mobile object. In one embodiment, the mobile object server may generate the new mobile object agent in the same manner described in S623. The mobile object server may also communicate with the object server via the gateway apparatus, and register the current region of the target mobile object in the object agent corresponding to the target mobile object. By generating the new mobile object agent, the system can handle a new mobile object 10 that has been not managed by the mobile object server.

At S666, the mobile object server may transfer the mobile object agent from the other mobile object server determined to manage the mobile object agent for the target mobile object at S664. In one embodiment, the mobile object server may receive information of the mobile object agent for the target mobile object from the other mobile object server, and generate a new mobile object agent including the received information. The mobile object server may also communicate with the object server via the gateway apparatus, and register the current region of the target mobile object in the object agent of the target mobile object.

Next, at S667, the mobile object server may receive a notification event list for the target mobile object. In one embodiment, the mobile object server first determines the target route where the target mobile object is located. Then, the mobile object server may request the event agent that manages the information of target event(s) and influence event(s) corresponding to the target route to send a notification event list containing information of the target event(s) and influence event(s) of the target route.

At S668, the mobile object server may update the current location of the target mobile object by the mobile object agent. In one embodiment, the mobile object agent for the target mobile object updates the current location of the target mobile object based on the position information of the car probe data.

At S669, the mobile object server may execute the mobile object agent for the target mobile object to provide the target mobile object with information that assists the target mobile object with traveling in the geographic space based on the information included in the event list. In one embodiment, the mobile object agent may provide the target mobile object with information of events on the notification event list.

In one embodiment, the at least one mobile object server may execute the mobile object agent for the target mobile object to provide the target mobile object with information that assists the target mobile object with traveling in the geographic space based on the information of the at least one passenger of the target mobile object. For example, the mobile object agent may provide the target mobile object with an alert, a notice, and/or an action list relating events on the notification event list depending on a number of passengers (e.g., for guiding a car pool lane), the age, gender, license, real time information (e.g., driving history or sleep history), and characteristics of the passengers.

The action list is a list of actions recommended to passengers in response to the events (e.g., braking, accelerating, and/or steering of the target mobile object).

The action list may include commands to the target mobile object for automatic driving and/or driving assist. In one embodiment, the mobile object agent may include information that the passenger is sensitive to rough driving, and then the mobile object agent may provide commands to gently drive the target mobile object. In one embodiment, the mobile object agent may include information of driving skill of a driver passenger, and then provide different commands depending on the skill of the driver. The mobile object server may provide the target mobile object with the information via the gateway apparatus.

As described above, the mobile object server receives information from the target mobile object in the region assigned to the mobile object server, and generates the mobile object agent for the target mobile object if there is no mobile object server among the plurality of mobile object servers that is executing the mobile object agent.

Figure 14:
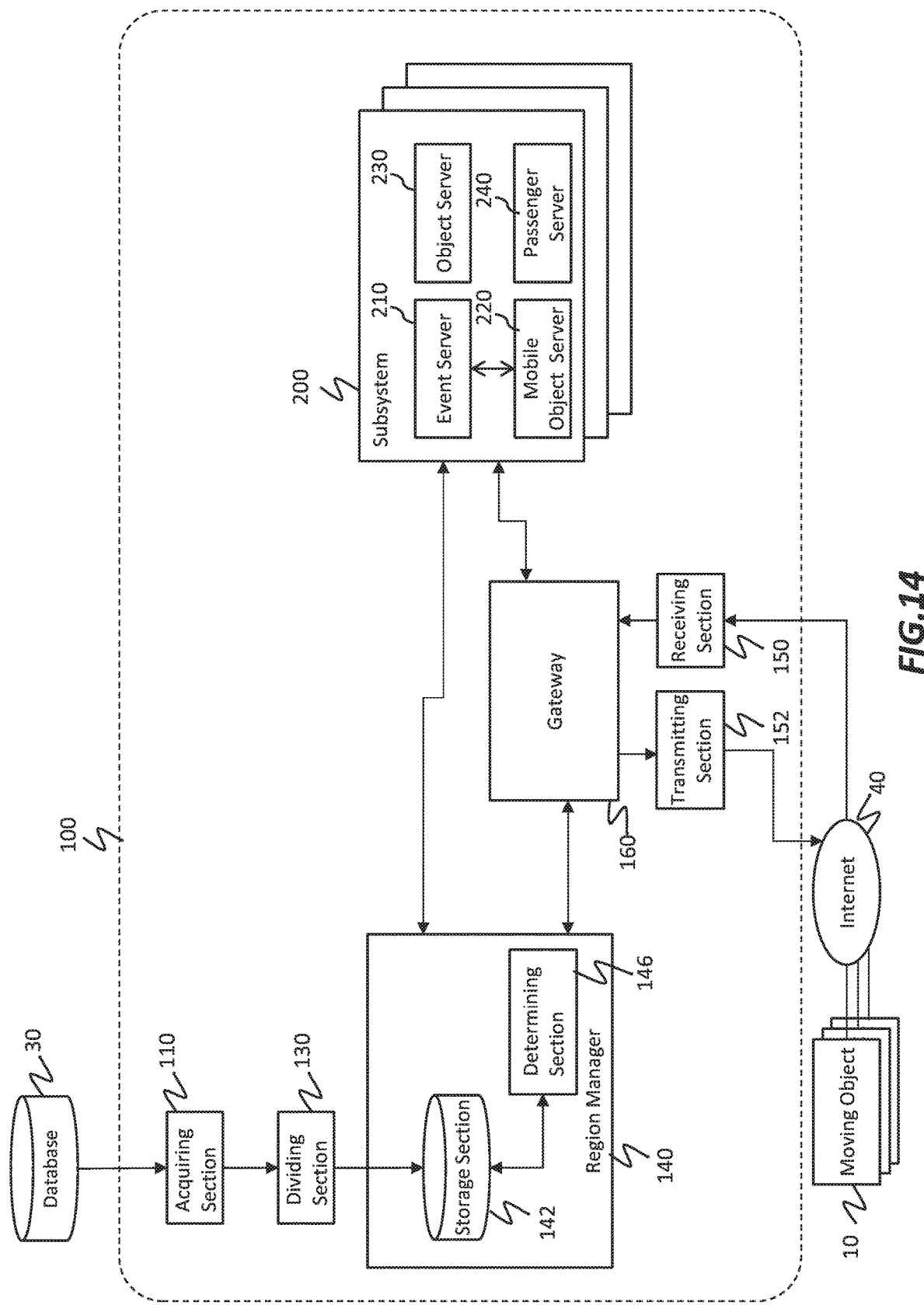
FIG. 14 shows a second exemplary configuration of the system 100 according to the present embodiment.

FIG. 14 shows an exemplary configuration of the system 100, according to an embodiment of the present invention. In this embodiment, each subsystem 200 includes an event server 210, mobile object server 220, an object server 230, and a passenger server 240. However, other embodiments are also possible, in which each subsystem 200 comprises any combination of singles or multiples of each server. In other embodiments, the system 100 may manage allocation of object agents of the object server 230 and passenger agents of the passenger server 240 in the subsystem 200. For example, the gateway apparatus 160 may change allocation of the object/passenger agents to the subsystems 200 to rectify the imbalance of data processing loads among the subsystems 200.

In the embodiment described above, the event server 210 may manage allocated event agents. In other embodiments, the system 100 may manage allocation of event agents to the event servers 210. For example, the gateway apparatus 160 may change allocation of event agents to the event servers 210 to rectify the imbalance of loads of processing events among the event servers 210. In the embodiment described above, the event server 210 causes each event agent to manage allocated divided area derived from a region. In other embodiment, the event server 210 causes at least one event agent to manage specific information regarding events (e.g., cross section of roads or other specific function(s) of a map, or, hurricane or other disaster/accident).

Figure 15:
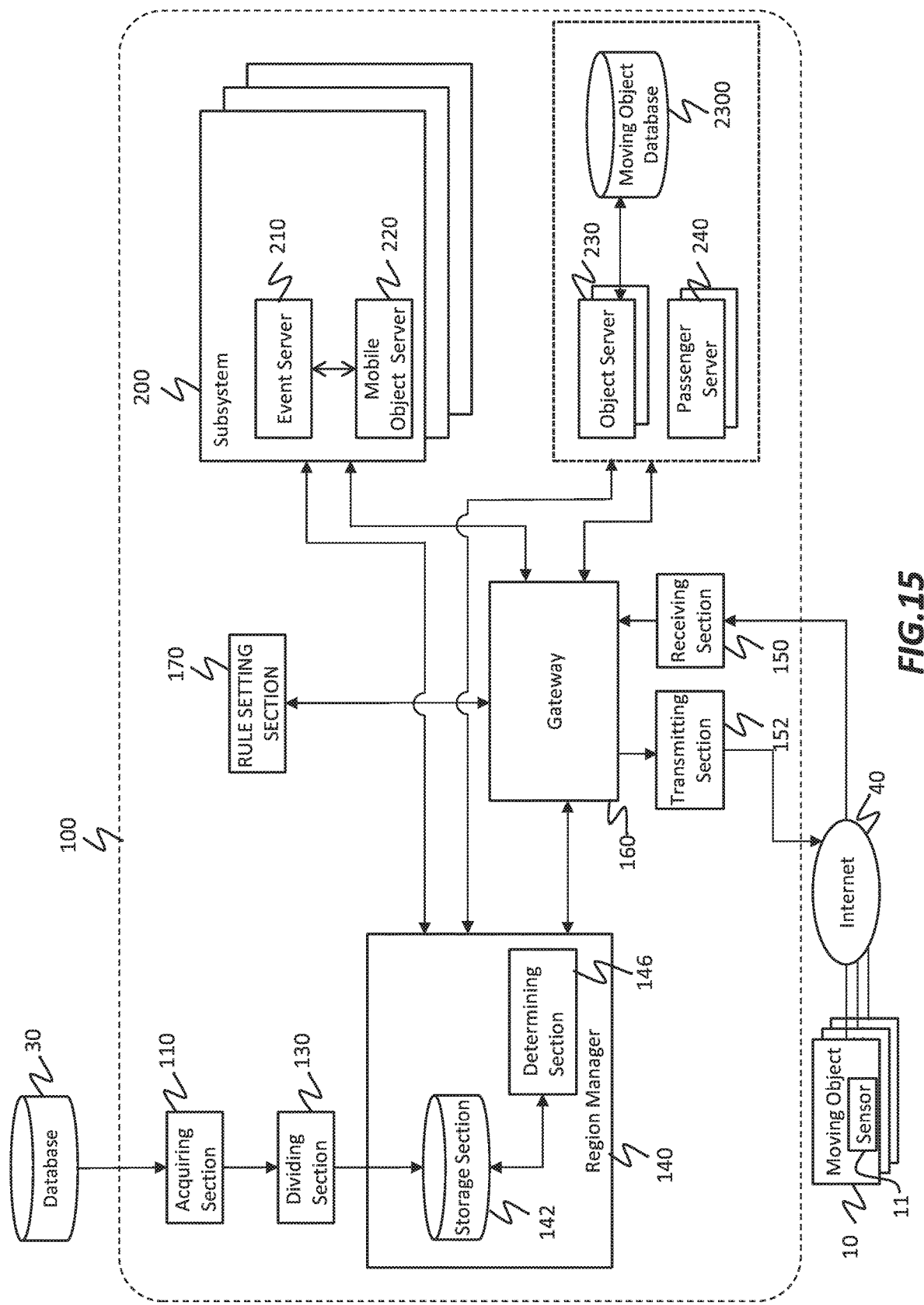
FIG. 15 shows an exemplary configuration of the system 100 according to another embodiment.

FIG. 15 shows an exemplary configuration of the system 100 according to another embodiment. In the system 100 according to the present embodiment, components having substantially the same operation as components in the system 100 shown in FIG. 3 and FIG. 14 are given the same reference numerals, and descriptions thereof are omitted.

In the present exemplary configuration, the mobile object 10 may include one or more sensors 11 for detecting an event/candidate event. For example, the mobile object 10 may include, as the sensor 11, an image sensor for identifying road signs, obstacles, and the like and/or LIDAR (Light Detection and Ranging, Laser Imaging Detection and Ranging) for identifying obstacles. In addition to or instead of this, the mobile object 10 may include a sound sensor for detecting damage to the mobile object 10 and/or abnormalities in the engine noise as the sensor 11. The mobile object 10 may include sensors 11 independently for each sensing region, and may include sensors 11 respectively facing forward and to the right, forward and to the left, straight forward, and straight backward.

In the present exemplary configuration, the system 100 may further include a mobile object database 2300 and a rule setting section 170.

The mobile object database 2300 may store the reliability with which each of a plurality of mobile objects 10 moving in a geographic space detects an event (referred to as the detection reliability). For example, the mobile object database 2300 may store the detection reliability of each mobile object 10 in association with each of the plurality of mobile objects 10. Furthermore, the mobile object database 2300 may store the detection reliability of each mobile object 10 in association with each of the one or more sensors 11 of the mobile object 10. Here, the event detection reliability is the certainty of the detection result of an event by the mobile object 10. As an example, in the present exemplary configuration, the detection reliability may be a value in a range from 0.9 to 1.1, where a higher value indicates greater reliability. The detection reliability may be updated according to the process flow described further below. The initial value of the detection reliability may be set arbitrarily from the type, model, model year, and the like of the mobile object 10 and/or the sensor 11 of the mobile object 10, and may be set to be 1.0.

The mobile object database 2300 may store statistical information of detection results of events/candidate events by the plurality of mobile objects 10. For example, the statistical information may be information obtained by acquiring statistics for each of the type, model, model year, total distance travelled, and driver of the mobile objects 10, or at least one combination of these categories, for the correctness of a plurality of detection results by the plurality of mobile objects 10. Here, the correctness may be the ratio of correct detection results, and may be a ratio with which events registered in an event list are detected or a ratio with which an event that is moved from the event list to the candidate event list is not detected. Acquiring statistics for each type of mobile object 10 is performed because it is possible for a difference to occur in the identification rate of events, and therefore the correctness, due to the shape or the like of the mobile object 10. Acquiring statistics for each model year and/or the total distance travelled is performed because it is possible for a difference to occur in the correctness due to the degradation caused by aging. Acquiring statistics for each driver is performed because it is possible for a difference to occur in the correctness due to the differences in the angle of the sensor 11 relative to an event, the length of time during which the event can be detected, and the like as a result of the drivers having different driving styles, e.g. turning at high speed at intersections, driving close to other automobiles, and the like. Furthermore, these statistics are also acquired because it is possible for a difference to occur in the correctness due to the path normally travelled, the frequency of car washing (in other words, the ratio of the outer surface of the sensor 11 being clear), and/or the like being different. The statistical information may be information obtained by acquiring statistics for at least one of each sensor, each sensing region, and each detection rule of the mobile objects 10, in addition to or instead of the information described above.

The mobile object database 2300 may be connected to the object server 230. The information in the mobile object database 2300 may be updated by the object server 230.

The rule setting section 170 may set a detection rule for detecting one event/candidate event, for at least one mobile object 10. Here, the detection rule may at least designate the event/candidate event to be detected by the mobile object 10. The rule setting section 170 may supply at least one mobile object 10 with the set detection rule, via the gateway apparatus 160.

Here, in the present exemplary configuration, the acquiring section 110 may acquire a dynamic map from the database 30. The dynamic map may be a high-definition digital geographic map that incorporates not only information concerning geographic objects, but also event information that changes over time, such as accidents, traffic jams, and construction regulations. The dynamic map may be provided to each mobile object 10 from the transmitting section 152.

The receiving section 150 may receive car probe data that includes the information concerning the event/candidate event detected in the geographic space by one mobile object 10 among the plurality of mobile objects 10, from this one mobile object 10. The received event/candidate event information may be supplied to the event server 210 corresponding to the region in which this one mobile object 10 is located, by the gateway apparatus 160. The receiving section 150 may receive probe data relating to each detected event from two or more mobile objects 10.

If the event/candidate event information detected by one mobile object 10 is received, the event server 210 may judge the reliability of this one event (referred to as event reliability) based on the detection reliability associated with the one mobile object 10 in the mobile object database 2300.

The event server 210 may register/update the information concerning the one event/candidate event and the group including the event reliability thereof, for the event list/candidate event list, using the target event agent. Here, the event reliability is the certainty of the event occurring. As an example, in the present exemplary configuration, the event reliability may be a value in a range from 0.9 to 1.1, where a higher value indicates greater reliability. Furthermore, in the present exemplary configuration, the event and the candidate event may be classified according to the event reliability, and the candidate event may be an event whose event reliability is less than a threshold value, e.g. 1.0.

The mobile object server 220 may be operable to assist with the movement of the plurality of mobile objects 10 in the geographic space. For example, if the travel route of the mobile object 10 is confirmed, e.g. if the travel route is provided to the mobile object 10 via car navigation or the like, the mobile object server 220 may provide this mobile object 10 with the event information occurring on this route. Furthermore, if the travel route of the mobile object 10 is not confirmed, the mobile object server 220 may calculate one or more routes (Most Probable Paths (MPP)) that are most likely to be travelled in the future by mobile objects 10 that are currently travelling and provide this mobile object 10 with the event information occurring on these routes.

With the system 100 described above, the event reliability of one event detected by one mobile object 10 is judged based on the detection reliability associated with the one mobile object 10. Accordingly, it is possible to provide the reliability of the detected event. Furthermore, since the event reliability is judged based on the detection reliability associated with the sensor 11 that detected the one event, it is possible to provide event reliability with higher accuracy.

Figure 16:
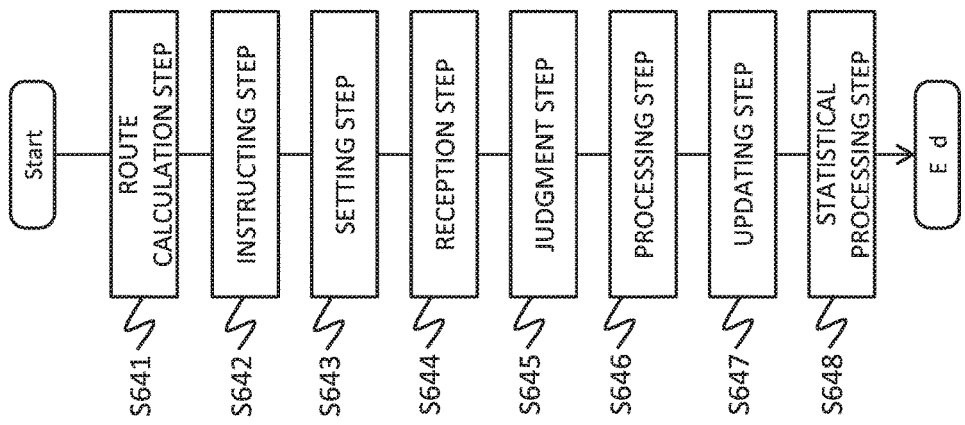
FIG. 16 shows a process flow of the system 100 according to the present embodiment.

FIG. 16 shows a process flow of the system 100 according to the present embodiment. The system 100 according to the present embodiment judges the event reliability by performing this operational flow.

First, in S641, the mobile object server 220 may calculate the MPP of one mobile object 10. For example, the mobile object server 220 may calculate the MPP using, in addition to the current travel history of the one mobile object 10, at least one of pattern matching that utilizes the travel history up to the most recent travel history for the one mobile object 10, the travel state of another mobile object 10 at the current time point, and the current time range, day of the week, and the like. The mobile object server 220 may calculate the MPP by performing deep learning. If the travel route of the mobile object 10 is confirmed, the mobile object server 220 may set this travel route to be the MPP.

Next, in S642, the rule setting section 170 may issue instructions for the deletion of information of one or more target objects to be set as detection targets, from the map information of the geographic space possessed by the one mobile object 10. For example, the rule setting section 170 may issue instructions for the deletion of the information of the target object from a map portion along the MPP, in the map provided to the one mobile object 10 from the transmitting section 152. The target object may be a road accessory or a known event/candidate event that is already registered in the event/candidate event list. The event/candidate event may be a traffic jam, a speed limit, road construction, an obstacle, a fire near the road, or the like. The road accessory may be installations or works necessary for maintaining the road structure, ensuring safe and smooth commuting on the road, and road management, and may be a fence, pole, street sign, mirror, street lamp, geographic point mark, road sign or the like on the road. The process of S642 does not need to be performed.

Next, in S643, the rule setting section 170 may set the detection rule for detecting the one detection target, for the one mobile object 10. The detection target may be a known event/candidate event, or may be an unknown event that has yet to be registered in the event list/candidate event list. The detection target may be a target object deleted from the map by the process of S642. In this case, since the map information differs from the state of the road identified by the sensor 11 of the mobile object 10, it becomes more difficult to detect the detection target. If the process of S642 is not performed, the detection target may be a road accessory (e.g. a traffic signal or the like scheduled to be newly installed) that is present on the map. The detection target may be on the MPP. In this way, it is possible to remove the burden of setting the detection target on roads that have a low probability of being travelled.

The detection rule may further include a position on the map at which detection is to be performed. As an example, in the present embodiment, this position may be on the MPP. In addition to this, the detection rule may further include a relative position of the detection target (e.g. forward and to the right or the like) for the mobile object 10 located at this position. The detection rule may further include environment conditions of a case in which the detection is to be performed by applying this rule, e.g. the brightness of the surrounding area or the like. The rule setting section 170 may set, as a usage target, any one detection rule from among a plurality of detection rules stored in advance.

The rule setting section 170 may set the difficulty of the detection in association with the detection rule. In this way, in S646 described further below, it is possible to improve the efficiency when updating the detection reliability according to the detection result. For example, the rule setting section 170 may set the difficulty of the detection associated with the detection rule based on the statistical information of the detection results of the detection target by one or more mobile objects 10. As an example, the rule setting section 170 may set a low difficulty if the correctness corresponding to one mobile object 10 in the statistical information is greater than or equal to a first reference correctness (e.g. 95%), and may set a high difficulty if this correctness is less than a second reference correctness (e.g. 80%).

The processes from S641 to S643 described above may be performed between S620 and S630 in FIG. 6. If the system 100 judges that the process is not to be ended in S680 in FIG. 6, the system 100 may move to the process of S641.

Here, when the detection rule is set for the one mobile object 10 according to S643, this one mobile object 10 may attempt to detect the detection target according to this detection rule. The one mobile object 10 may transmit the detection result to the receiving section 150. The one mobile object 10 may include, in the detection result, an ID of this one mobile object 10 and/or an ID of the sensor 11 that performed the detection. If the detection target is not detected when the one mobile object 10 passes through the position on the map where the detection target is to be detected, the one mobile object 10 may transmit notification of this fact, or does not need to transmit the detection result. If a road accessory that was deleted from the map by the process of S642 and designated as a detection target by the process of S643 is detected, in the present embodiment, as an example, the mobile object 10 may transmit a detection result indicating that the detection target was detected, or may transmit the detection result indicating that an event/candidate event for the occurrence of an obstacle (the road accessory in this case) was detected. The mobile object 10 for which the detection rule is set may perform detection of events that are not already set as detection targets by this detection rule in parallel.

Next, in S644, the receiving section 150 may receive information concerning the detection target detected by the one mobile object 10. The receiving section 150 may supply the event server 210 with the received information via the gateway apparatus 160.

The receiving section 150 may change the reception frequency of the detection result from the one mobile object 10, according to the detection reliability of the one mobile object 10. For example, the receiving section 150 may set the reception frequency to be high in advance if the detection reliability is higher than a reference reliability (e.g. 1.05). The process of S644 may be the process of S630 in FIG. 6.

Next, in S645, if an event is designated in the detection rule, the event server 210 may judge the event reliability of the corresponding event/candidate event according to the detection result. Instead of or in addition to this, if an event/candidate event that is not designated in the detection rule is detected by the mobile object 10, the event server 210 may judge the event reliability of the corresponding event/candidate event. The judgement concerning the event reliability may be performed by the target event agent corresponding to the position of the one mobile object 10.

The event server 210 may judge the event reliability based on the detection reliability of the one mobile object 10. The event server 210 may judge the event reliability of the detected event/candidate event based on the detection reliability associated with the one sensor 11 that detected the event/candidate event among the one or more sensors 11 of the one mobile object 10.

For example, using the ID of the one mobile object 10 or the ID of the one sensor 11 included in the detection result as a key, the event server 210 may read the detection reliability of this one mobile object 10 or one sensor 11 that detected the event/candidate event from the mobile object database 2300.

If a detection result indicating detection of an unknown event/candidate event is received, the event server 210 may judge the detection reliability of the one mobile object 10 or the one sensor 11 that detected the event/candidate event to be the event reliability as-is. As an example, if the detection reliability is 1.1, the event server 210 may judge the event reliability to be 1.1. Instead of this, the event server 210 may judge the event reliability to be a lowest value of 0.9 if the detection reliability of the one mobile object 10 is less than a reference value (e.g. 0.95), and judge the event reliability to be a highest value of 1.1 if the detection reliability is greater than or equal to the reference value.

If a detection result indicating that an unknown event/candidate event was not detected is received, e.g. if an unknown event designated by the detection rule is not detected, the event server 210 may judge the event reliability to be the lowest value of 0.9.

If a plurality of detection results for one event/candidate event are received from two or more mobile objects 10, the event server 210 may judge the event reliability of the one event/candidate event based on the detection reliability associated with each of these mobile objects 10 (or each sensor 11).

Here, a case in which a plurality of detection results are received for one event/candidate event may be a case in which two or more mobile objects 10 each detect a respective one event/candidate event, a case in which only some of the two or more mobile objects 10 detect the one event/ candidate event, and/or a case in which none of the two or more mobile objects 10 detect the one event/candidate event. While the event server 210 is judging the event reliability in response to receiving a plurality of detection results, the one event/candidate event may be known or may remain unknown, or may transition from being unknown to being known. An example of a case in which the one event/candidate event remains unknown includes a case in which detection results from a plurality of mobile objects 10 are received continuously in a short time for an unknown event/candidate event, for example.

In such a case, the event server 210 may once again judge the event reliability based on the detection reliability of the mobile object 10/sensor 11 corresponding to the ID included in the most recent detection result for this event/candidate event and on each detection reliability of the mobile object 10/sensor 11 corresponding to the IDs included in one or more previous detection results (e.g. each detection reliability stored in the event list/candidate event list).

For example, in a case where the plurality of detection results are each a detection result indicating affirmative detection, the event server 210 may judge the event reliability to be the highest value of 1.1 if the event/candidate event is detected by at least a first reference number (e.g. 2) of the mobile objects 10 and the detection reliability of each mobile object 10 is greater than or equal to a first reference threshold value (e.g. 1.05). Furthermore, the event server 210 may judge the event reliability to be the highest value of 1.1 if the event/candidate event is detected by at least a second reference number (e.g. 10), which is greater than the first reference number, of the mobile objects 10 and the detection reliability of each mobile object 10 is greater than or equal to a second reference threshold value (e.g. 1.00), which is less than the first reference threshold value. The event server 210 may judge the highest value, the lowest value, or the average value among the detection reliabilities to be the new event reliability.

If the plurality of detection results are each a detection result indicating that there was no detection, the event server 210 may judge the event reliability to be the lowest value of 0.9.

If some of the plurality of detection results are detection results indicating affirmative detection and others are detection results indicating that there was no detection, the event server 210 may judge the highest value, the lowest value, or the average value among the detection reliabilities to be the new event reliability.

The event server 210 may judge the event reliability further based on at least one of the behavior state of the one mobile object 10 and the environment at the location of the one mobile object 10. For example, if there is a possibility of the performance of the sensor 11 dropping because of the behavior state and/or environment of the mobile object 10, the event server 210 may judge the event reliability using a detection reliability that has been reduced by a prescribed value. In this way, it is possible to judge the event reliability with higher accuracy. Such a behavior state may be a state in which the mobile object travels at a speed greater than or equal to a reference speed, travels on a bumpy road, travels on a curb, makes a turn, or the like. Furthermore, such an environment may be an environment in which the travel speed of a nearby mobile object 10 is greater than or equal to a reference speed, an environment in which the illumination is less than a reference illumination, a rainy environment, or the like, for example.

The process of S645 described above may be performed between the processes of S651 and S652 in FIG. 8.

Next, in S646, the event server 210 and the mobile object server 220 perform the process corresponding to the detection result of the event/event candidate by the one mobile object 10.

The event server 210 may update the event list/candidate event list.

For example, the event server 210 may register the event and the candidate event in a list based on the event reliability. As an example, if an unregistered event is detected, the event server 210 may register an event whose event reliability has been judged to be greater than or equal to a threshold value (e.g. 1.05) in the event list, and may register an event whose event reliability has been judged to be less than the threshold value as a candidate event in the candidate event list. The event server 210 may register the detection reliability of the mobile object 10/sensor 11 that made the detection in the list in association with the event/candidate event.

If the judgment is made for an event/candidate event that has already been registered, the event server 210 may add the detection reliability of the mobile object 10/sensor 11 corresponding to the ID included in the detection result to the list. If an event is detected and the event reliability of this event is judged to be less than the threshold value, the event server 210 may downgrade this event to being a candidate event, register this event in the candidate event list, and delete this event from the event list. If a registered candidate event is detected and the event reliability thereof is judged to be greater than or equal to the threshold value, the event server 210 may upgrade this candidate event to an event, register this event in the event list, and delete this event from the candidate event list. A hysteresis may be created in which the threshold value for downgrading an event and the threshold value for upgrading a candidate event are different values. The registration of an event/candidate event in a list and the deletion of an event/candidate event from a list may be performed by the event agent corresponding to the position of this event/candidate event.

The event server 210 may update the map acquired by the acquiring section 110 and provided to the mobile object 10, according to the detection result. For example, if a new event is registered in the event list, the event server 210 may add this event to the map. If an event is deleted from the event list, the event server 210 may delete this event from the map. The addition of an event to the map and the deletion of an event from the map may be performed by the event agent corresponding to the position of this event.

The mobile object server 220 may perform a process relating to a plurality of mobile objects 10 with the assumption that an event exists, on a condition that the event reliability is greater than or equal to a reference reliability. For example, the mobile object server 220 may notify one or more mobile objects 10 differing from the one mobile object 10 about the existence of one event using the corresponding mobile object agent, on a condition that the event reliability of the one event is greater than or equal to the reference reliability (e.g. 1.05). The other mobile objects 10 may be automobiles following after the one mobile object 10. In this way, the other mobile objects 10 can avoid the one event. The mobile object server 220 may search for a movement route of another mobile object 10 with the assumption that the one event exists using the mobile object agent for the other mobile object 10, on a condition that the event reliability of the one event is greater than or equal to the reference reliability. As an example, if the event is detected on the MPP of the other mobile object 10, the mobile object server 220 may search for a movement route that avoids this event and provide this other mobile object 10 with this movement route. In this case, the mobile object server 220 may search for a movement route with the assumption that the one event exists.

The process of S646 described above may be performed in S669 in FIG. 13.

Next, in S647, the object server 230 may update the detection reliability of the one mobile object 10 in the mobile object database 2300, based on the detection result of one detection target by the one mobile object 10, using the object agent. For example, the object server 230 may update the detection reliability of the one mobile object 10 based on whether the one mobile object 10 has detected the presence of a detection target that is a target object deleted from the map information by the process of S642. The object server 230 may increase the detection reliability if the target object is detected, and may decrease the detection reliability if the target object is not detected. The object server 230 may cause the increase amount of the detection reliability to be greater if the detection target is deleted from the map information than if the detection target is not deleted.

If the difficulty of the detection is associated with the detection rule, the object server 230 may change the update amount of the detection reliability of the one mobile object 10 based on this difficulty. For example, the object server 230 may cause the increase amount used when there is affirmative detection to be greater when the difficulty is greater, and may cause the decrease amount used when there is no detection to be greater when the difficulty is lower. If the detection target designated by a detection rule with a difficulty lower than a reference value is not detected by the one mobile object 10, the object server 230 may judge that the sensor 11 of the one mobile object 10 is damaged, and set the detection reliability to the lowest value. In this case, the object server 230 may provide the information concerning the sensor 11 judged to be damaged to the one mobile object 10 from the mobile object server 220 corresponding to this one mobile object 10.

Next, in S648, the object server 230 may perform an update by adding the detection result from the one mobile object 10 and newly generating statistical information in the mobile object database 2300, using the object agent.

The processes of steps S647 and S648 may be performed between S660 and S680 in FIG. 6. The process of S648 may be performed before the process of S647.

With the operational flow described above, the processes relating to a plurality of mobile objects 10 (e.g. notification about the presence of an event or searching for a movement route) are performed with the assumption that the event exists, on a condition that the event reliability of the (candidate) event detected in S646 is greater than or equal to a reference reliability. Accordingly, if the event reliability is high, the process relating to the unknown (candidate) event can be performed immediately for other mobile objects 10. Accordingly, unlike a case in which the candidate event is upgraded to an event based on the number of detections, it is possible to quickly provide other mobile objects 10 with the information of the unknown event.

Furthermore, in S647, the detection reliability of the mobile object 10 in the mobile object database 2300 is updated based on the detection result of the event by the mobile object 10, and therefore it is possible to maintain the value of the detection reliability at a value corresponding to the actual detection accuracy.

If a detection target that is a target object that has been deleted from the map information is detected, the detection reliability of the mobile object 10 is increased in S647, and therefore the difficulty of the detection is increased and it is possible to bring the value of the detection reliability closer to the actual detection accuracy.

Furthermore, since the detection rule is set, it is possible to dynamically test the detection reliability. Yet further, since the update amount of the detection reliability is changed based on the difficulty of the detection associated with the detection rule, it is possible to bring the value of the detection reliability closer to a value corresponding to the actual detection accuracy.

Since the detection reliability is updated using the detection result, it is possible to eliminate the effort of calculating and setting a strict detection reliability from detailed data such as the model and type of the sensor 11 mounted in the mobile object 10. Furthermore, since it is possible to perform a diagnostic examination of the detection reliability in real time, it is possible to detect damage and degradation due to aging of the sensor 11.

Since the reception frequency of the detection result by the one mobile object 10 is changed according to the detection reliability of the one mobile object 10, it is possible to prioritize the reception of detection results by a mobile object 10 with high detection reliability over the reception of detection results by a mobile object 10 with low detection reliability. Accordingly, it is possible to quickly provide other mobile objects 10 with information concerning an event having high event reliability.

FIG. 17 shows an exemplary candidate event list in the present embodiment. The candidate event list in the present embodiment may include reliability of an event in association with edge IDs of candidate events, counts of detecting candidate events, locations of candidate events, specific contents of candidate events for each candidate event, and the like.

FIG. 18 shows an exemplary detection rule. This detection rule designates a target object in a geographic space as the detection target. For example, in this detection rule, there is one target object (see Portion (I)) designated as existing within a range of 50 m from a mobile object 10 at a position with a latitude of 49 degrees 19 minutes and a longitude of 12 degrees 393 minutes (see Portion (IV)). Furthermore, this detection rule designates that the target object is positioned forward and to the right of the mobile object 10 (see Portion (II)), and that a color (e.g. orange) is shown in the range of # FF8800-FF88FF (see Portion (III)). This detection rule further includes a numerical value (e.g. 100 lux) for the environment illumination in a case where detection is to be performed.

FIG. 19 shows exemplary data of the detection result. This data may show that one pole with a length of 20 cm existing in a range of 3 to 4 meters from the mobile object 10 has been detected. The "Length Affected" in the drawing may be a distance at which attention must be paid to the detection target, and may be a required separation distance from the detection target, for example.

Figure 20:
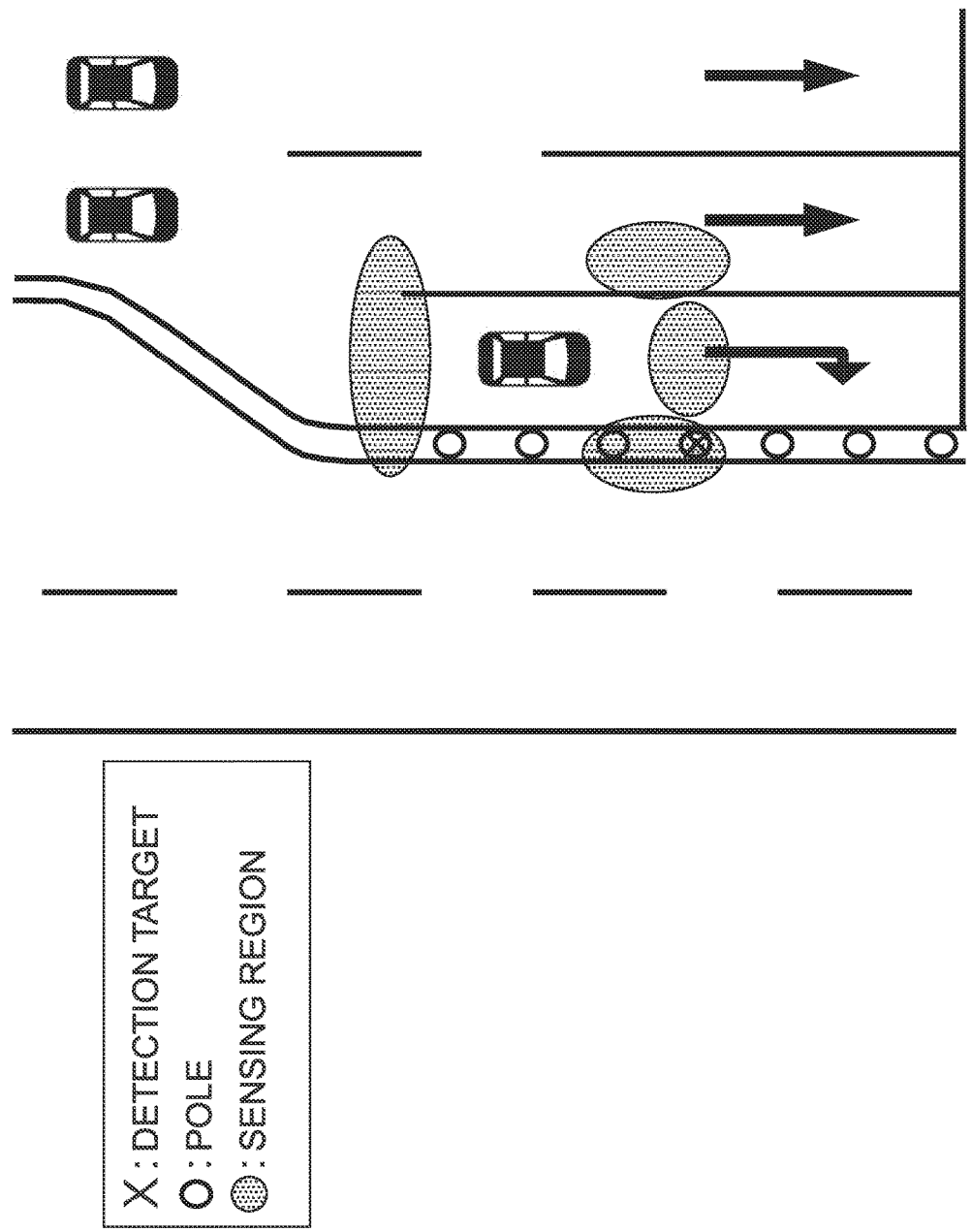
FIG. 20 shows a detection target object designated by the detection rule of FIG. 18.

FIG. 20 shows a detection target object designated by the detection rule of FIG. 18. In the drawing, the circle symbols indicate the poles as road accessories, and the hashed regions indicate sensing regions of the one or more sensors 11 of the mobile object 10. Here, in the present embodiment, the sensing region includes regions forward and to the right, straight forward, and straight backward from the mobile object 10. Furthermore, the X mark in the drawing indicates the detection target designated by the detection rule. In the present embodiment, as an example, the detection target is an orange-colored pole. The pole that is the detection target may be deleted in advance from the map information of the mobile object 10 in the process of S642.

If the mobile object 10 detects the detection target, the mobile object 10 may transmit a detection result indicating the detection of the detection target, or may transmit a detection result indicating the detection of an event/candidate event that causes an obstacle. The mobile object 10 may also transmit this detection result if an unknown event that is not designated by the detection rule (e.g. an event of an obstacle being present forward and to the right) is detected. If the mobile object 10 detects the detection target of an event differing from the detection target, the reliability of this event may be judged in the process of S645. If the event reliability is greater than or equal to a reference reliability (e.g. 1.05), in the process of S646, notification of the existence of this event may be provided to other mobile objects 10 (e.g. a plurality of mobile objects 10 in the top portion of the drawing).

If the mobile object 10 does not detect the detection target, in the process of S647, the detection reliability of the mobile object 10 or the sensor 11 facing forward and to the right may be reduced.

FIG. 21 shows exemplary statistical information stored in the mobile object database 2300. This statistical information indicates the correctness for each combination of a type, a model, a sensing region, and a detection rule of the mobile object 10. With this statistical information, if a mobile object 10 whose type is "A" and model is "model 001" performs detection using a detection rule "B" (e.g. the detection rule shown in FIG. 18) in the sensing region "forward and to the right," the correctness is 90%. In S643, based on this correctness, the difficulty may be set for a case in which the mobile object 10 whose type is "A" and model is "model 001" performs detection using a detection rule "B" in the sensing region "forward and to the right."

FIG. 22 shows another example of statistical information stored in the mobile object database 2300. This statistical information indicates the correctness for each combination of a driver, a sensing region, and a detection rule. With this statistical information, if the mobile object 10 driven by the driver "John Smith" performs detection using a detection rule "B" (e.g. the detection rule shown in FIG. 18) in the sensing region "forward and to the right," the correctness is 83%.

In the present embodiment above, an example is described in which the system 100 includes the rule setting section 170, but the rule setting section 170 may be included in the event server 210 or the object server 230 instead. Furthermore, the rule setting section 170 is described as deleting the information concerning the target object from the map information in the process of S642, but the process of S642 does not need to be performed. In addition to this, the rule setting section 170 is described as setting the detection rule in the process of S643, but the process of S643 does not need to be performed. In this case, the mobile object 10 may detect a known and/or unknown event/candidate event. Furthermore, the system 100 does not need to include the rule setting section 170.

In the above description, the information concerning an event with low event reliability among the events detected by the mobile object 10 is registered in the candidate event list as a candidate event, but such an event may be deleted without being registered. For example, the event server 210 may register the information concerning an event whose event reliability is greater than or equal to a threshold value (e.g. 0.95), and delete the information concerning an event whose event reliability is less than the threshold value without registering this event.

Figure 23:
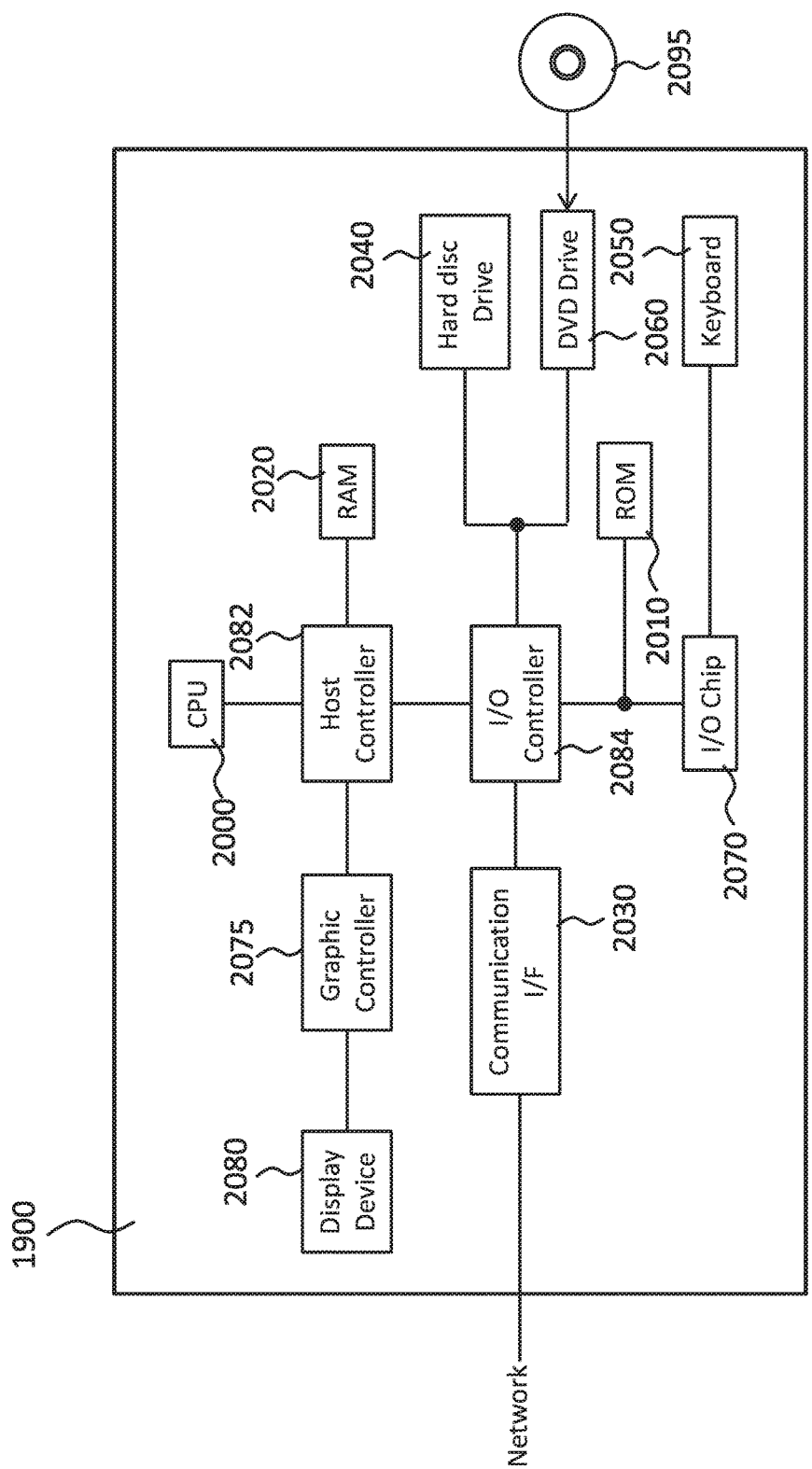
FIG. 23 shows an exemplary hardware configuration of a computer according to the embodiment of the invention.

FIG. 23 shows an exemplary hardware configuration of a computer configured to perform the foregoing operations, according to an embodiment of the present invention. A program that is installed in the computer 700 can cause the computer 700 to function as or perform operations associated with apparatuses of the embodiments of the present invention or one or more sections (including modules, components, elements, etc.) thereof, and/or cause the computer 700 to perform processes of the embodiments of the present invention or steps thereof. Such a program may be executed by the CPU 2000 to cause the computer 700 to perform certain operations associated with some or all of the blocks of flowcharts and block diagrams described herein.

The computer 700 according to the present embodiment includes a CPU 2000, a RAM 2020, a graphics controller 2075, and a display device 2080, which are mutually connected by a host controller 2082. The computer 700 also includes input/output units such as a communication interface 2030, a hard disk drive 2040, a DVD-ROM drive 2060 and an IC card drive, which are connected to the host controller 2082 via an input/output controller 2084. The computer also includes legacy input/output units such as a ROM 2010 and a keyboard 2050, which are connected to the input/output controller 2084 through an input/output chip 2070.

The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020 or in itself, and causes the image data to be displayed on the display device 2080.

The communication interface 2030 communicates with other electronic devices via a network 2035. The hard disk drive 2040 stores programs and data used by the CPU 2000 within the computer 700. The DVD-ROM drive 2060 reads the programs or the data from the DVD-ROM 2095, and provides the hard disk drive 2040 with the programs or the data via the RAM 2020. The IC card drive reads programs and data from an IC card, and/or writes programs and data into the IC card.

The ROM 2010 stores therein a boot program or the like executed by the computer 700 at the time of activation, and/or a program depending on the hardware of the computer 700. The input/output chip 2070 may also connect various input/output units via a parallel port, a serial port, a keyboard port, a mouse port, and the like to the input/output controller 2084.

A program is provided by computer readable media such as the DVD-ROM 2095 or the IC card. The program is read from the computer readable media, installed into the hard disk drive 2040, RAM 2020, or ROM 2010, which are also examples of computer readable media, and executed by the CPU 2000. The information processing described in these programs is read into the computer 700, resulting in cooperation between a program and the above-mentioned various types of hardware resources. An apparatus or method may be constituted by realizing the operation or processing of information in accordance with the usage of the computer 700-

For example, when communication is performed between the computer 700 and an external device, the CPU 2000 may execute a communication program loaded onto the RAM 2020 to instruct communication processing to the communication interface 2030, based on the processing described in the communication program. The communication interface 2030, under control of the CPU 2000, reads transmission data stored on a transmission buffering region provided in a recording medium such as the RAM 2020, the hard disk drive 2040, the DVD-ROM 2095, or the IC card, and transmits the read transmission data to network 2035 or writes reception data received from network 2035 to a reception buffering region or the like provided on the recording medium.

In addition, the CPU 2000 may cause all or a necessary portion of a file or a database to be read into the RAM 2020, the file or the database having been stored in an external recording medium such as the hard disk drive 2040, the DVD-ROM drive 2060 (DVD-ROM 2095), the IC card, etc., and perform various types of processing on the data on the RAM 2020. The CPU 2000 may then write back the processed data to the external recording medium.

Various types of information, such as various types of programs, data, tables, and databases, may be stored in the recording medium to undergo information processing. The CPU 2000 may perform various types of processing on the data read from the RAM 2020, which includes various types of operations, processing of information, condition judging, conditional branch, unconditional branch, search/replace of information, etc., as described throughout this disclosure and designated by an instruction sequence of programs, and writes the result back to the RAM 2020. In addition, the CPU 2000 may search for information in a file, a database, etc., in the recording medium. For example, when a plurality of entries, each having an attribute value of a first attribute is associated with an attribute value of a second attribute, are stored in the recording medium, the CPU 2000 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 700. In addition, a recording medium such as a hard disk or a RAM provided in a server system connected to a dedicated communication network or the Internet can be used as the computer readable media, thereby providing the program to the computer 700 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, with the embodiments of the present invention, it is possible to provide the reliability of a detected event.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

What is claimed is:

1. A method for managing mobile object, the method comprising:
   receiving an event detected in a geographic space by a mobile object of a plurality of mobile objects;
   determining a reliability of the event based on a reliability associated with the mobile object, wherein determining the reliability of the event includes determining the reliability of the one event based on the reliability associated with each of two or more mobile objects among the plurality of mobile objects in the mobile object database, in response to the two or more mobile objects detecting the one event; and
   storing the event in a mobile object database based on the reliability of the event being above a reference reliability.

2. The method according to claim 1, further comprising:
   performing a process relating to the plurality of mobile objects based on the event being stored in the mobile object database.

3. The method according to claim 2, wherein performing the process includes providing notification of existence of the one event to another mobile object among the plurality of mobile objects.

4. The method according to claim 2, wherein
   performing the process includes searching for a movement route of another mobile object among the plurality of mobile objects.

5. The method according to claim 1, further comprising:
   updating, in the mobile object database, the reliability associated with the mobile object that detected the event in the mobile object database based on a detection result of the one event by the mobile object.

6. The method according to claim 5, wherein
updating, in the mobile object database, the reliability associated with the mobile object that detected the event based on whether the mobile object has detected existence of a target object in the geographic space.

7. The method according to claim 6, further comprising:
issuing instructions to delete information concerning the target object from map information of the geographic space possessed by the mobile object, wherein
updating, in the mobile object database, the reliability associated with the mobile object that detected the event includes increasing the reliability of the mobile object detecting an event, in response to the mobile object detecting the existence of the target object deleted from the map information.

8. The method according to claim 5, further comprising:
creating a detection rule for detecting the one event, for the mobile object.

9. The method according to claim 8, wherein
creating the detection rule includes setting a difficulty of the detection in association with the detection rule, and
updating, in the mobile object database, the reliability associated with the mobile object that detected the event includes updating an update amount of the reliability of the mobile object detecting an event, based on the difficulty of the detection associated with the detection rule.

10. The method according to claim 9, wherein
creating the detection rule includes setting the difficulty of the detection associated with the detection rule based on statistical information of detection results of an event from at least a portion of the plurality of mobile objects.

11. The method according to claim 10, further comprising:
determining the statistical information for at least a portion of the mobile objects among the plurality of mobile objects, wherein the statistical information is selected from the group consisting of: a type of vehicle, a model of vehicle, a year model of vehicle, and a total movement distance.

12. The method according to claim 1, wherein
receiving the event detected in the geographic space by the mobile object of the plurality of mobile objects includes changing a reception frequency of the event detected by the mobile object, according to the reliability of the mobile object detecting an event.

13. The method according to claim 1, wherein
storing the event in a mobile object database includes storing the reliability of each mobile object among the plurality of mobile objects detecting an event in the mobile object database, in association with each of one or more sensors possessed by each mobile object, and
determining the reliability of the event includes determining the reliability of the one event based on the reliability associated with a sensor that detected the one event for the mobile object in the mobile object database.

14. The method according to claim 1, wherein
determining the reliability of the event includes determining the reliability of the one event further based on at least one of a behavior state of the mobile object and an environment at a location of the mobile object.

15. A computer program product for managing mobile object, the computer program product comprising:
a computer-readable storage device and program instructions stored on computer-readable storage device, the program instructions comprising:
receiving an event detected in a geographic space by a mobile object of a plurality of mobile objects;
determining a reliability of the event based on a reliability associated with the mobile object, wherein determining the reliability of the event includes determining the reliability of the one event based on the reliability associated with each of two or more mobile objects among the plurality of mobile objects in the mobile object database, in response to the two or more mobile objects detecting the one event; and
storing the event in a mobile object database based on the reliability of the event being above a reference reliability.

16. The computer program product according to claim 15 further comprising performing a process relating to the plurality of mobile objects based on the event being stored in the mobile object database.

17. The computer program product according to claim 15 further comprising updating, in the mobile object database, the reliability associated with the mobile object that detected the event in the mobile object database based on a detection result of the one event by the mobile object.

18. A computer system for managing mobile object, the computer system comprising:
a processor, a computer-readable tangible storage device, and program instructions stored on computer-readable tangible storage device for execution by the processor, the program instructions comprising:
receiving an event detected in a geographic space by a mobile object of a plurality of mobile objects;
determining a reliability of the event based on a reliability associated with the mobile object, wherein determining the reliability of the event includes determining the reliability of the one event based on the reliability associated with each of two or more mobile objects among the plurality of mobile objects in the mobile object database, in response to the two or more mobile objects detecting the one event; and
storing the event in a mobile object database based on the reliability of the event being above a reference reliability.

19. The computer system according to claim 18, the computer program product further comprising performing a process relating to the plurality of mobile objects based on the event being stored in the mobile object database.

* * * * *